United States Patent
Kamamoto et al.

(10) Patent No.: US 12,126,949 B2
(45) Date of Patent: Oct. 22, 2024

(54) CONVERSION ELEMENT MEMBER, AND CONVERSION ELEMENT MODULE AND ELECTRONIC DEVICE INCLUDING CONVERSION ELEMENT MEMBER

(71) Applicant: NITTO DENKO CORPORATION, Osaka (JP)

(72) Inventors: Yu Kamamoto, Osaka (JP); Takeo Inoue, Osaka (JP); Tamao Fukushima, Osaka (JP); Hisae Kitagawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 372 days.

(21) Appl. No.: 17/605,119

(22) PCT Filed: Apr. 24, 2020

(86) PCT No.: PCT/JP2020/017857
§ 371 (c)(1),
(2) Date: May 27, 2022

(87) PCT Pub. No.: WO2020/218590
PCT Pub. Date: Oct. 29, 2020

(65) Prior Publication Data
US 2022/0312091 A1    Sep. 29, 2022

(30) Foreign Application Priority Data
Apr. 26, 2019 (JP) ................ 2019-086643

(51) Int. Cl.
*H04R 1/02* (2006.01)
*H04R 1/28* (2006.01)
(52) U.S. Cl.
CPC ............ *H04R 1/02* (2013.01); *H04R 1/2807* (2013.01); *H04R 2201/003* (2013.01)

(58) Field of Classification Search
CPC ... H04R 1/02; H04R 1/2807; H04R 2201/003
See application file for complete search history.

(56) References Cited

U.S. PATENT DOCUMENTS

| 2011/0069855 A1 | 3/2011 | Tokuda et al. |
| 2014/0154517 A1* | 6/2014 | Sasaoka ............ B32B 27/308 |
| | | 428/423.7 |

(Continued)

FOREIGN PATENT DOCUMENTS

| CN | 204795560 | 11/2015 |
| CN | 208739421 | 4/2019 |

(Continued)

OTHER PUBLICATIONS

Office Action issued in Corresponding JP Patent Application No. 2020-077792, dated Jul. 2, 2024, along with an English translation thereof.

*Primary Examiner* — Suhan Ni
(74) *Attorney, Agent, or Firm* — Greenblum & Bernstein, P.L.C.

(57) ABSTRACT

The conversion element member of the present disclosure includes: a conversion element having an opening capable of functioning as a ventilation port and/or a sound-transmitting port; and a waterproof membrane. The conversion element has an outer surface provided with the opening. The waterproof membrane is joined, at a joining portion thereof, to the outer surface of the element so as to cover the opening, the joining portion having a shape surrounding the opening when viewed in a direction perpendicular to the outer surface. The waterproof membrane has a non-joining portion defined as a portion surrounded by the joining portion when viewed in the direction, the non-joining portion having a region overlapping the outer surface when viewed in the direction. A spacing distance D1 between the membrane and (Continued)

the outer surface in the region is 0.01 mm to X mm, where X represents, in an indentation test on the waterproof membrane.

19 Claims, 7 Drawing Sheets

(56) References Cited

U.S. PATENT DOCUMENTS

| | | |
|---|---|---|
| 2015/0373439 A1 | 12/2015 | Mori |
| 2016/0037256 A1 | 2/2016 | Katsuda et al. |
| 2016/0301998 A1 | 10/2016 | Abe et al. |
| 2016/0318281 A1* | 11/2016 | Ikoma .................. B29C 55/005 |
| 2017/0041692 A1 | 2/2017 | Watson et al. |
| 2021/0067851 A1* | 3/2021 | Fukushima ............. B32B 5/022 |

FOREIGN PATENT DOCUMENTS

| | | |
|---|---|---|
| JP | 10-165787 | 6/1998 |
| JP | 2009-290466 | 12/2009 |
| JP | 2015-119474 | 6/2015 |
| KR | 10-2015-0122693 | 11/2015 |

\* cited by examiner

CONVERSION ELEMENT MEMBER, AND CONVERSION ELEMENT MODULE AND ELECTRONIC DEVICE INCLUDING CONVERSION ELEMENT MEMBER

TECHNICAL FIELD

The present invention relates to a conversion element member that includes a conversion element having an opening capable of functioning as a ventilation port and/or a sound-transmitting port and a waterproof membrane preventing entry of water. The present invention also relates to a conversion element module and an electronic device that include the conversion element member.

BACKGROUND ART

A housing of an electronic device may be provided with an external transmission port that is an opening through which sound, gas, or the like can pass. For example, electronic devices such as wearable devices including smart watches, smartphones, mobile phones, and cameras have an audio function, and include a housing provided with an external transmission port through which sound can pass. Also, such an electronic device includes, in the housing, a sound conversion part including an acoustic conversion element such as a microphone or a speaker. The acoustic conversion element is an element performing conversion between an electric signal and sound, and has an opening that functions as a sound-transmitting port on an outer surface thereof. The sound conversion part is placed in the housing such that sound can be transmitted between the sound conversion part and the outside through the external transmission port. In addition, electronic devices including a gas sensor such as a pressure sensor include a housing provided with an external transmission port through which gas can pass. Such an electronic device includes, in the housing, a characteristics conversion part including a characteristics conversion element performing conversion between characteristics of gas and an electric signal. The characteristics conversion element has an opening that functions as a ventilation port on an outer surface thereof. The characteristics conversion part is placed in the housing such that gas can be transmitted between the characteristics conversion part and the outside through the external transmission port. Meanwhile, it is necessary to prevent water from entering the sound conversion part and the characteristics conversion part that normally have an electronic circuit. To this end, a waterproof membrane preventing entry of water is conventionally attached to the housing so as to cover the external transmission port.

Patent Literature 1 discloses a porous polytetrafluoroethylene (hereinafter referred to as "PTFE") membrane that can be used as a waterproof membrane.

CITATION LIST

Patent Literature

Patent Literature 1: JP H10-165787 A

SUMMARY OF INVENTION

Technical Problem

It has conventionally been sufficient for electronic devices to exhibit, as waterproofness required for the electronic devices, a temporary waterproofness for addressing an unexpected fall of such a device into shallow water from which the device can be easily picked up. However, at present, a high-level waterproofness is often required. For example, it is required that functions of an electronic device including an audio function can be used as those with normal characteristics even after the device is used in water at a depth of several meters for a certain period or repeatedly. In addition, it is important for electronic devices having an audio function to ensure not only waterproofness but also sound transmission characteristics. However, with respect to waterproof membranes, waterproofness and sound transmission are in a trade-off relationship, and it is not easy to improve the waterproofness of the waterproof membranes while the sound transmission is maintained. These points are not considered in Patent Literature 1.

It is an object of the present invention to provide a technology capable of enhancing waterproofness of an electronic device and suppressing a decrease in performance of the electronic device even when water pressure is applied.

Solution to Problem

The present invention provides a conversion element member including:
 a conversion element having an opening capable of functioning as a ventilation port and/or a sound-transmitting port; and
 a waterproof membrane, wherein
 the conversion element has an outer surface provided with the opening,
 the waterproof membrane is joined, at a joining portion thereof, to the outer surface of the conversion element so as to cover the opening, the joining portion having a shape surrounding the opening when viewed in a direction perpendicular to the outer surface,
 the waterproof membrane has a non-joining portion defined as a portion surrounded by the joining portion when viewed in the direction perpendicular to the outer surface, the non-joining portion having a region overlapping the outer surface when viewed in the direction, and
 a spacing distance D1 between the waterproof membrane and the outer surface in the region is 0.01 mm or more and X mm or less,
 where X represents, in an indentation test of a probe on the waterproof membrane performed according to a piercing strength test specified in Japanese Industrial Standards (JIS) Z1707: 1997, an indentation amount of the probe when a repulsive force generated in the waterproof membrane by indentation of the probe reaches a maximum value.

In another aspect, the present invention provides a conversion element module including:
 the conversion element member according to the present invention; and
 a circuit board on which the conversion element member is mounted.

In still another aspect, the present invention provides an electronic device including:
 a housing provided with an external transmission port allowing sound and/or gas to pass therethrough; and
 the conversion element member according to the present invention placed in the housing, wherein the conversion element member is placed in the housing such that entry of water from an outside of the housing into the opening through the external transmission port is prevented by the waterproof membrane.

Advantageous Effects of Invention

According to the present invention, it is possible to enhance waterproofness of an electronic device, and suppress a decrease in performance of the electronic device even when water pressure is applied.

DESCRIPTION OF EMBODIMENTS

Embodiments of the present invention will be described with reference to the drawings. The present invention is not limited to the embodiments below.

Conversion Element Member

Figure 1A:
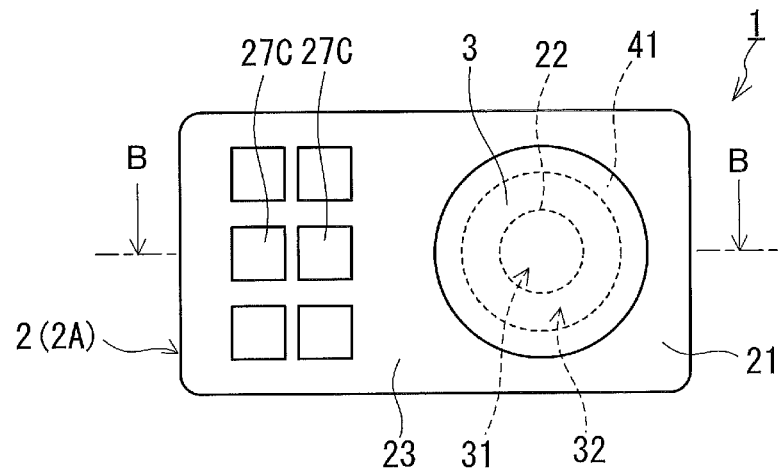
FIG. 1A is a plan view schematically showing an example of a conversion element member of the present invention.
Figure 1B:
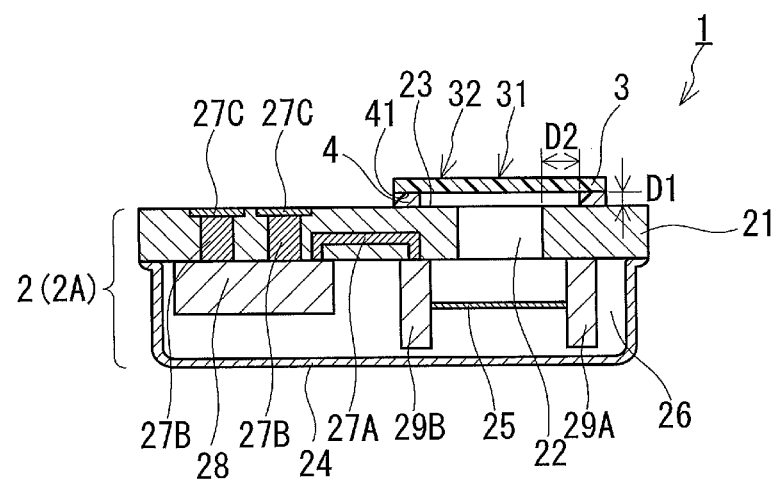
FIG. 1B is a cross-sectional view showing a cross-section B-B of the conversion element member shown in FIG. 1A.

FIGS. 1A and 1B show an example of a conversion element member of the present invention. FIG. 1B shows a cross section B-B shown in FIG. 1A. FIG. 1A shows a conversion element member 1 as seen from the side of a surface of a conversion element 2 on which a waterproof membrane 3 is placed.

The conversion element member 1 includes the conversion element 2 and the waterproof membrane 3. The conversion element 2, which is included in the conversion element member 1 in FIGS. 1A and 1B, is a MEMS microphone 2A that is a kind of the acoustic conversion element (acoustic transducer) performing conversion between sound and an electric signal. The MEMS microphone 2A includes a substrate 21 having an opening (sound-transmitting port) 22 through which sound can pass. A surface of the substrate 21 in which the opening 22 is provided is exposed to the outside while the waterproof membrane 3 is not placed. In other words, the conversion element 2 has an outer surface 23 provided with the opening 22. In the present description, the outer surface 23 of the conversion element 2 refers to the surface which is exposed to the outside while the waterproof membrane 3 is not placed. The waterproof membrane 3 is joined to the outer surface 23 of the conversion element 2 so as to cover the opening 22, more specifically, so as to cover the opening 22 in the outer surface 23. Also, the waterproof membrane 3 is joined to the outer surface 23 at a joining portion 41 of the membrane 3 having a shape surrounding the opening 22 when viewed in a direction perpendicular to the outer surface 23. In the conversion element member 1, the waterproof membrane 3 has a non-joining portion 31 defined as a portion surrounded by the joining portion 41 when viewed in the direction perpendicular to the outer surface 23, and the non-joining portion 31 has a region 32 overlapping the outer surface 23 when viewed in the perpendicular direction. In other words, a portion of the non-joining portion 31 of the waterproof membrane 3 is positioned between the opening 22 and the joining portion 41 when viewed in the direction perpendicular to the outer surface 23. In addition, a spacing distance D1 between the waterproof membrane 3 and the outer surface 23 in the region 32 is 0.01 mm or more and X mm or less. X represents, in an indentation test of a probe on the waterproof membrane 3 performed according to a piercing strength test specified in JIS Z1707: 1997, an indentation amount of the probe on the waterproof membrane 3 when a repulsive force generated in the waterproof membrane 3 by indentation of the probe reaches the maximum value. The indentation amount X corresponds to the maximum deformation amount of the waterproof membrane 3 deformable within the elastic deformation range.

When water pressure is applied to the waterproof membrane 3 of the conversion element member 1 in a direction to the conversion element 2, the waterproof membrane 3 becomes deformed at the non-joining portion 31 in a direction to the opening 22. However, in the conversion element member 1, the upper limit of the spacing distance D1 between the waterproof membrane 3 and the outer surface 23 in the region 32 is limited to X mm or less. Accordingly, even when water pressure applied to the waterproof membrane 3 is large or even when water pressure is continuously applied to the waterproof membrane 3, deformation of the waterproof membrane 3 is limited to the elastic deformation range without reaching plastic deformation, owing to contact of the deformed waterproof membrane 3 with the outer surface 23. In the case where the conversion element 2 is an acoustic conversion element, the waterproof membrane 3 is required to prevent entry of water while permitting sound to pass therethrough. Also, in this case, a portion of the waterproof membrane 3 through which sound mainly passes is the non-joining portion 31. Contact of the non-joining portion 31 of the waterproof membrane 3 with the outer surface 23 even after being released from water pressure decreases the sound transmission of the waterproof membrane 3, and thus decreases the sound transmission characteristics of the conversion element member 1. Also, deformation remaining in the waterproof membrane 3 even after being released from the water pressure (permanent deformation) decreases the sound transmission of the waterproof membrane 3, and thus decreases the sound transmission characteristics of the conversion element member 1. In the conversion element member 1, deformation of the waterproof membrane 3 due to water pressure is limited to within the elastic deformation range. This can reduce the degree of permanent deformation of the waterproof membrane 3. Also, even when the non-joining portion 31 of the waterproof membrane 3 is brought into contact with the outer surface 23 due to application of water pressure, the contact can be prevented from continuing after release from the water pressure.

Figure 2:
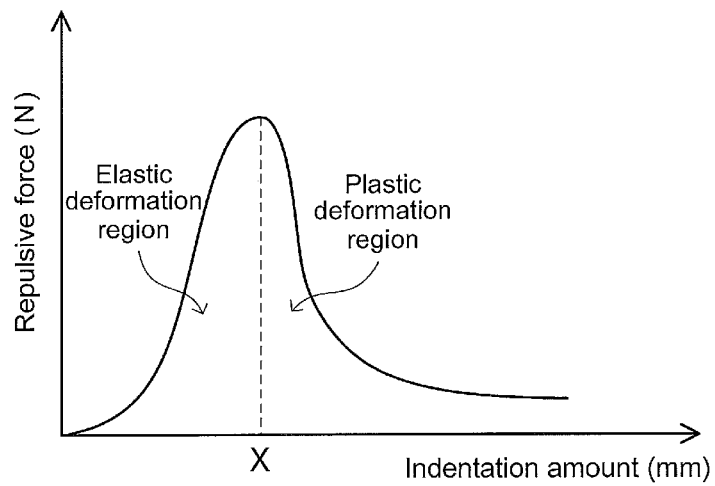
FIG. 2 is a diagram showing an example of a relationship between an indentation amount of a probe on a waterproof membrane and a repulsive force generated in the waterproof membrane by indentation of the probe that can be evaluated by an indentation test.

In JIS Z1707: 1997, the puncture strength test for plastic films for food packaging is specified. According to the specification, an indentation test can be performed in which a stick-like needle (probe) is indented on the waterproof membrane 3 to be evaluated from one of surfaces thereof at a constant speed and evaluation is performed on an indentation amount of the probe on the waterproof membrane 3 and a repulsive force generated in the waterproof membrane 3 by the indentation. In the indentation test, the waterproof membrane 3 becomes deformed in accordance with the indentation of the probe. However, while the indentation amount of the probe is small and the deformation of the waterproof membrane 3 remains within the elastic deformation range, the repulsive force generated in the waterproof membrane 3 increases as the indentation amount increases. Then, when the indentation amount of the probe further increases and accordingly the deformation of the waterproof membrane 3 reaches plastic deformation, the repulsive force generated in the waterproof membrane 3 decreases (see FIG. 2. FIG. 2 shows an example of a relationship between the indentation amount of the probe on the waterproof membrane 3 and the repulsive force generated in the waterproof membrane 3 by indentation of the probe). Accordingly, the indentation amount X of the probe when the repulsive force reaches the maximum value corresponds to the maximum deformation amount of the waterproof membrane 3 deformable within the elastic deformation range. The probe to be used is a 0.8 mm diameter cylindrical probe having ends one of which has a 0.35 mm radius hemispherical shape to be indented to the waterproof membrane 3. Also, an indentation speed of the probe on the waterproof membrane 3 is set to 10 mm/min, and the evaluation is performed in an atmosphere of 25±5° C. Note that since determination of the piercing strength against the waterproof membrane 3 is not intended, it is unnecessary in the above indentation test to continue to indent the probe until the probe penetrates the waterproof membrane 3. Indentation of the probe may be stopped at a stage where the indentation amount X of the probe when the repulsive force reaches the maximum value is determined. Also, since the values of the piercing strength themselves are not evaluation targets in the above indentation test, the test does not necessarily need to be performed on five or more test pieces. For example, the indentation amount X may be determined by performing the test on one test piece. It is of course possible to perform the test on a plurality of test pieces and determine, as the indentation amount X, an average value of indentation amounts when respective repulsive forces obtained for the test pieces reach the maximum value.

Also, in the conversion element member 1, the lower limit of the spacing distance D1 is set to 0.01 mm or more. This can prevent that vibration of the non-joining portion 31 of the waterproof membrane 3 while no water pressure is applied is hindered by contact with the outer surface 23. Prevention of the vibration of the non-joining portion 31 from being hindered can contribute to good sound transmission characteristics of the conversion element member 1.

In recent years, as represented by wearable devices such as smart watches, electronic devices having an audio function have been increasingly reduced in size. To respond to size reduction in electronic devices, an area reduction in waterproof membrane is necessary. According to the study by the present inventors, in the case where the area of the non-joining portion (sound-transmitting part) 31, which is a portion of the waterproof membrane 3 through which sound mainly passes, is reduced, a smaller distance between the opening 22 of the conversion element 2 and the waterproof membrane 3 more suppresses a decrease in sound transmission characteristics of the conversion element member 1 due to the area reduction, thus to ensure better sound transmission characteristics. From this viewpoint, the spacing distance D1 may be 2 mm or less, 1.5 mm or less, 1 mm or less, less than 1 mm, or even 0.9 mm or less. Also, the spacing distance D1 may be equal to or less than a smaller value selected from the X mm and 2 mm, equal to or less than a smaller value selected from the X mm and 1.5 mm, equal to or less than a smaller value selected from the X mm and 1 mm, or even equal to or less than a smaller value selected from the X mm and 0.9 mm. In addition, to suppress the deterioration in characteristics more reliably, the spacing distance D1 may be 0.9 times or less, 0.8 times or less, 0.7 times or less, or even 0.6 times or less the indentation amount X.

In the example shown in FIGS. 1A and 1B, the waterproof membrane 3 is circular when viewed in a direction perpendicular to a main surface of the waterproof membrane 3. However, the shape of the waterproof membrane 3 is not limited to this example, as long as the waterproof membrane 3 can cover the opening 22 of the conversion element 2 and can be joined to the outer surface 23 at the joining portion 41, which has the shape surrounding the opening 22 when viewed in the direction perpendicular to the outer surface 23 and as long as the non-joining portion 31 can have the region 32 overlapping the outer surface 23 when viewed in the above direction. The shape of the waterproof membrane 3 may be a circle (including a substantially circular shape), an ellipse (including a substantially elliptical shape), a polygon including a rectangle and a square, or an irregular shape when viewed in the direction perpendicular to the main surface of the waterproof membrane 3. The corners of the polygon may be rounded.

In the example shown in FIGS. 1A and 1B, the shape of the joining portion 41 of the waterproof membrane 3 is a shape corresponding to a peripheral portion of the membrane 3, and more specifically is a ring shape, when viewed in the direction perpendicular to the main surface of the waterproof membrane 3. However, the shape of the joining portion 41 is not limited to this example, as long as the joining portion 41 can join the waterproof membrane 3 to the outer surface 23 such that the water proof membrane 3 covers the opening 22 and the joining portion 41 has the shape surrounding the opening 22 when viewed in the direction perpendicular to the outer surface 23.

In the example shown in FIGS. 1A and 1B, the waterproof membrane 3 is joined to the outer surface 23 by an adhesive portion 4. The adhesive portion 4 normally has the same shape as the joining portion 41 when viewed in the direction perpendicular to the main surface of the waterproof membrane 3. The adhesive portion 4 may be, for example, an adhesive layer formed of an adhesive (a pressure-sensitive adhesive can be used), or may be a double-faced adhesive tape. In the case where the adhesive portion 4 is a double-faced adhesive tape, the waterproof membrane 3 can be more reliably joined to the outer surface 23, thereby further enhancing the waterproofness of the conversion element member 1. Note that the method of joining the waterproof membrane 3 to the outer surface 23 is not limited to the above example, and the waterproof membrane 3 may be joined to the outer surface 23 for example by welding such as heat welding or ultrasonic welding.

For the double-faced adhesive tape that can form the adhesive portion 4, a known double-faced adhesive tape can be used. The substrate of the double-faced adhesive tape is, for example, a film, a nonwoven fabric, or a foam of a resin. The resin that can be used for the substrate is not limited, and examples of the resin include polyesters (PET, etc.), polyolefins (polyethylene, etc.), and polyimides. For the adhesive layer of the double-faced adhesive tape, various adhesives such as acrylic-based adhesives and silicone-based adhesives can be used. Acrylic-based adhesives are preferably used for the adhesive layer since the joining strength to the waterproof membrane 3 and/or the outer surface 23 can be improved. The double-faced adhesive tape may be a thermal adhesive tape. The double-faced adhesive tape may be a substrate-less double-faced adhesive tape with no substrate.

Figure 3A:
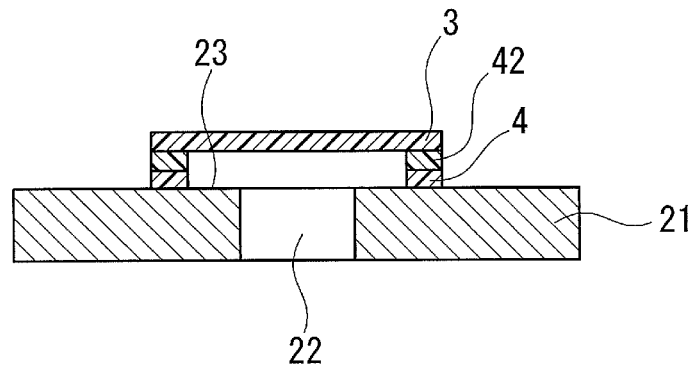
FIG. 3A is a cross-sectional view showing the vicinity of an opening of a conversion element and a waterproof membrane in an example of the conversion element member of the present invention.
Figure 3B:
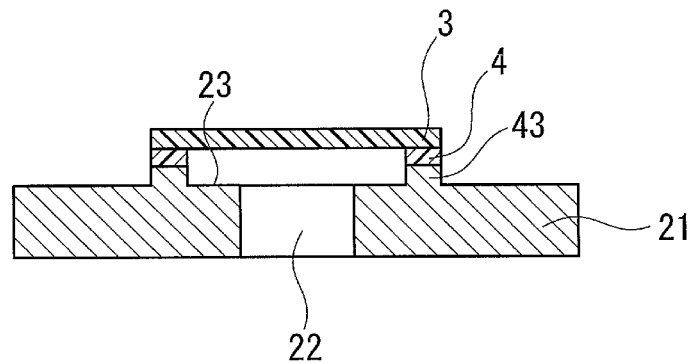
FIG. 3B is a cross-sectional view showing the vicinity of the opening of the conversion element and the waterproof membrane in an example of the conversion element member of the present invention.

In the example shown in FIGS. 1A and 1B, the waterproof membrane 3 is joined to the outer surface 23 with the adhesive portion 4 interposed therebetween. In this case, the spacing distance D1 can be controlled by the thickness of the adhesive portion 4. In the case where the adhesive portion 4 is a double-faced adhesive tape, the spacing distance D1 can be controlled further reliably. However, the method of controlling the spacing distance D1 is not limited to this example. For example, as shown in FIG. 3A, the waterproof membrane 3 may be joined to the outer surface 23 with a spacer 42 interposed therebetween. In this case, the spacing distance D1 can be controlled by the thickness of the spacer 42. The spacer 42 may have the same shape as the joining portion 41 when viewed in the direction perpendicular to the main surface of the waterproof membrane 3. The adhesive portion 4, welding, or the like can be used for joining the outer surface 23 and the spacer 42 and for joining the spacer 42 and the waterproof membrane 3. In the example shown in FIG. 3A, the spacer 42 and the outer surface 23 are joined to each other with the adhesive portion 4 interposed therebetween. In another example shown in FIG. 3B, the substrate 21 has a protruding portion 43 protruding from the outer surface 23, and the waterproof membrane 3 may be joined to the outer surface 23 at the protruding portion 43. In this case, the spacing distance D1 can be controlled by the height of the protruding portion 43. The protruding portion 43 may have the same shape as the joining portion 41 when viewed in the direction perpendicular to the main surface of the waterproof membrane 3. The adhesive portion 4, welding, or the like can be used for joining the protruding portion 43 and the waterproof membrane 3. Note that any combination of the above-described methods may be adopted.

In the example shown in FIGS. 1A and 1B, the shape of the region 32 is a shape surrounded by the joining portion 41 and the opening 22, and more specifically is a ring shape that is a shape of a gap between the joining portion 41 and the opening 22, when viewed in the direction perpendicular to the outer surface 23. However, the shape of the region 32 is not limited to this example. Also, in the example shown in FIGS. 1A and 1B, a distance D2 between the joining portion 41 and the opening 22 in the region 32 when viewed in the direction perpendicular to the outer surface 23 is larger than the spacing distance D1. The distance D2 may be 1.2 times or more, 1.4 times or more, 1.5 times or more, 1.7 times or more, 1.9 times or more, or even twice or more the spacing distance D1. Also, the distance D2 is, for example, 0.5 mm or more, and may be 1.0 mm or more, 1.5 mm or more, 2.0 mm or more, 2.5 mm or more, or even 3.0 mm or more. In these cases, the above deformation limitation on the waterproof membrane 3 deformed due to water pressure is performed further reliably. The distance D2 can be defined by rotating a virtual straight line, which extends from the center of the opening 22 in parallel to the outer surface 23, around the center of the opening 22 along the outer surface 23, and taking the average length during the rotation of a portion of the virtual straight line as the distance D2, the portion passing through the region 32 (overlapping the region 32 when viewed in the direction perpendicular to the outer surface 23). Also, the average length can be defined as half of the sum of the maximum length and the minimum length of the portions of the virtual straight line passing through the region 32. In the example shown in FIGS. 1A and 1B, half of the difference between the outer diameter and the inner diameter of the ring-shaped region 32 can be determined as the distance D2. The above minimum length may be 1.2 times or more, 1.4 times or more, 1.5 times or more, 1.7 times or more, 1.9 times or more, or even twice or more the spacing distance D1. Also, the above minimum length may be 0.5 mm or more, 1.0 mm or more, 1.5 mm or more, 2.0 mm or more, 2.5 mm or more, or even 3.0 mm or more.

The area of the non-joining portion 31 of the waterproof membrane 3 defined as a portion surrounded by the joining portion 41 when viewed in the direction perpendicular to the outer surface 23 may be, for example, 19.6 $mm^2$ or less, 12.6 $mm^2$ or less, 7.1 $mm^2$ or less, 4.9 $mm^2$ or less, 3.1 $mm^2$ or less, or even 1.8 $mm^2$ or less. In the case where the non-joining portion 31 has a circular shape when viewed in the direction perpendicular to the outer surface 23, the above areas correspond to respective areas of the non-joining portion 31 having circle diameters of 5 mm, 4 mm, 3 mm, 2.5 mm, 2 mm, and 1.5 mm.

In the example shown in FIGS. 1A and 1B, the maximum distance between the non-joining portion 31 of the waterproof membrane 3 and a plane including the outer surface 23 is equal to the spacing distance D1. This embodiment can be achieved for example by joining, to the outer surface 23, the flat waterproof membrane 3 on which no process of providing a convex portion and/or a concave portion or the like has been performed, without giving deformation such as slack. However, the maximum distance between the non-joining portion 31 of the waterproof membrane 3 and the plane including the outer surface 23 does not need to be equal to the spacing distance D1. The maximum distance may be, independently from the spacing distance D1, for example, 2 mm or less, 1.5 mm or less, 1 mm or less, less than 1 mm, or even 0.9 mm or less. Also, the maximum distance may be, independently from the spacing distance D1, a smaller value selected from the above X mm and 2 mm, a smaller value selected from the X mm and 1.5 mm, a smaller value selected from the X mm and 1 mm, or even a smaller value selected from the X mm and 0.9 mm.

The waterproof membrane 3 is a membrane that prevents entry of water while permitting sound to pass therethrough. Various known waterproof membranes can be used as the waterproof membrane 3. The waterproof membrane 3 may be subjected to an oil repellent treatment or a liquid repellent treatment.

The waterproof membrane 3 can be formed from, for example, a resin such as a polyester (PET, etc.), a polycarbonate, a polyethylene, a polyimide, PTFE, a polyurethane, and a silicone. However, the resin forming the waterproof membrane 3 is not limited to the above examples. As the material of the waterproof membrane 3, PTFE is suitable. A membrane formed from PTFE (PTFE membrane) has good balance between mass and strength. An elastomer membrane can be removed from the waterproof membrane 3. In the case where the waterproof membrane 3 is an elastomer membrane, a rubber elastic membrane having a rubber hardness of more than 80 (the upper limit is 100, for example) may be used. In the present description, the rubber hardness means the hardness evaluated by the type A durometer specified in JIS K6253: 2006.

The waterproof membrane 3 may be a porous membrane. The PTFE membrane may be a porous membrane (porous PTFE membrane) formed by stretching a cast membrane or a paste extrusion containing PTFE particles. The PTFE membrane may be sintered.

When an electronic device to which the conversion element member 1 is attached is expected to be exposed to higher water pressure, the waterproof membrane 3 is preferably a microporous membrane or a non-porous membrane. Both the microporous membrane and the non-porous membrane can have a higher water entry pressure and can have a lower degree of deformation due to water pressure. The microporous membrane may be a microporous PTFE membrane formed from PTFE. The non-porous membrane may be a non-porous PTFE membrane formed from PTFE.

In the present description, the microporous membrane refers to a membrane having an air permeability, in the thickness direction thereof, of 10 seconds/100 mL or more and 10,000 seconds/100 mL or less as represented by an air permeability (Gurley air permeability) obtained according to Method B (Gurley method) of air permeability measurement specified in Japanese Industrial Standards (hereinafter, referred to as "JIS") L1096: 2010. The lower limit of the Gurley air permeability of the microporous membrane may be 20 seconds/100 mL or more, and may be 30 seconds/100 mL or more, 40 seconds/100 mL or more, 50 seconds/100 mL or more, or even 70 seconds/100 mL or more. The upper limit of the Gurley air permeability of the microporous membrane may be 5000 seconds/100 mL or less, 1000 seconds/100 mL or less, or even 300 seconds/100 mL or less. In the present description, the non-porous membrane refers to a membrane having an air permeability, in the thickness direction thereof, greater than 10,000 seconds/100 mL as represented by the Gurley air permeability. The porous membrane normally has an air permeability, in the thickness direction thereof, of less than 10 seconds/100 mL as represented by the above Gurley air permeability.

Even when the size of the waterproof membrane 3 does not satisfy the test piece size (about 50 mm×50 mm) in the Gurley method, it is possible to evaluate the Gurley air permeability by using a measurement jig. An example of the measurement jig is a polycarbonate disc provided with a through hole (having a circular cross section with a diameter of 1 mm or 2 mm) at the center thereof and having a thickness of 2 mm and a diameter of 47 mm. Measurement of a Gurley air permeability using the measurement jig can be performed as follows.

A waterproof membrane to be evaluated is fixed to one of surfaces of the measurement jig so as to cover the opening of the through hole of the measurement jig. The fixation is performed such that, during measurement of a Gurley air permeability, air passes through only the opening and an effective test portion (portion overlapping the opening when viewed in a direction perpendicular to a main surface of the fixed waterproof membrane) of the waterproof membrane to be evaluated, and the fixed portion of the waterproof membrane does not hinder passing of air through the effective test portion of the waterproof membrane. For fixing the waterproof membrane, a double-faced adhesive tape having a ventilation port punched in a center portion thereof with a shape that matches the shape of the opening can be used. The double-faced adhesive tape can be placed between the measurement jig and the waterproof membrane such that the circumference of the ventilation port and the circumference of the opening coincide with each other. Next, the measurement jig having the waterproof membrane fixed thereto is set on a Gurley air permeability testing machine such that the surface on which the waterproof membrane is fixed is at the downstream side of airflow during measurement, and a time t1 taken for 100 mL of air to pass through the waterproof membrane is measured. Next, the measured time t1 is converted into a value t per effective test area of 642 [mm$^2$] specified in Method B (Gurley method) of air permeability measurement in JIS L1096: 2010, by the equation t={(t1)× (area of effective test portion of waterproof membrane [mm$^2$])/642 [mm$^2$]}, and the obtained conversion value t can be regarded as the Gurley air permeability of the waterproof membrane. When the above disc is used as the measurement jig, the area of the effective test portion of the waterproof membrane is the area of a cross section of the through hole. It has been confirmed that the Gurley air permeability measured without using the measurement jig for a waterproof membrane satisfying the above test piece size and the Gurley air permeability measured using the measurement jig after fragmenting the waterproof membrane coincide well with each other, that is, the use of the measurement jig does not substantially affect the measured values of the Gurley air permeability.

Condensation may occur inside the housing when the temperature of the housing decreases due to, for example, use, mounting or wearing of the electronic device in water. The occurrence of condensation can be prevented by reducing the amount of water vapor staying inside the housing. In the case where the waterproof membrane 3 is a non-porous membrane, for example, a non-porous PTFE membrane, entry of water vapor into the housing through the waterproof membrane 3 is prevented. Therefore, by selecting a non-porous membrane as the waterproof membrane 3, the amount of water vapor staying inside the housing can be reduced, so that occurrence of condensation inside the housing can be prevented.

Meanwhile, even if water vapor does not enter the housing through the waterproof membrane 3, retention of water vapor inside the housing is unavoidable in some cases. Such a case is, for example, the case where the housing is formed from a resin having hygroscopicity, such as polybutylene terephthalate (PBT), acrylonitrile-butadiene-styrene resin (ABS), polymethyl methacrylate (PMMA), polypropylene (PP), or polycarbonate (PC). In the housing formed from a resin having hygroscopicity, external water vapor absorbed by the housing itself tends to be released to the inside of the housing by heat from a heat source inside the housing and stay inside the housing. In this case, to prevent occurrence of condensation in the housing, it is preferable to select the waterproof membrane 3 capable of releasing water vapor staying inside the housing to the outside. An example of the selectable waterproof membrane 3 is a microporous membrane such as a microporous PTFE membrane. When the waterproof membrane 3 is a microporous membrane, it is possible to discharge retained water vapor to the outside due to the appropriate air permeability of the waterproof membrane 3 even though high waterproofness is achieved, so that occurrence of condensation inside the housing can be prevented.

The average pore diameter of the waterproof membrane 3 that is a microporous PTFE membrane is, for example, 0.01 to 1 μm. The porosity of the waterproof membrane 3 that is a microporous PTFE membrane is, for example, 5 to 50%. The average pore diameter of the PTFE membrane can be measured according to American Society for Testing and Materials (ASTM) F316-86. The porosity of the PTFE membrane can be calculated by substituting the mass, the thickness, the area (area of a main surface), and the true density of the membrane into the following equation. The true density of PTFE is 2.18 g/cm$^3$.

Porosity (%)={1−(mass[g]/(thickness[cm]×area [cm$^2$]×true density[2.18/cm$^3$]))}×100

The thickness of the waterproof membrane 3 is, for example, 1 to 50 μm, and may be 3 to 30 μm, or even 5 to 20 μm. When the thickness is within these ranges, the characteristics such as the waterproofness and the sound transmission characteristics of the waterproof membrane 3 can be improved in a well-balanced manner.

The surface density of the waterproof membrane 3 is, for example, 1 to 30 g/m$^2$, and may be 1 to 25 g/m$^2$. The surface density can be calculated by dividing the mass of the waterproof membrane 3 by the area (area of a main surface) of the waterproof membrane 3.

The waterproofness of the waterproof membrane 3 can be evaluated on the basis of water entry pressure (limit water entry pressure). The water entry pressure of the waterproof membrane 3 is, for example, 15 kPa or more. The water entry pressure of the waterproof membrane 3 that is a porous membrane may be 30 kPa or more, 40 kPa or more, 50 kPa or more, or even 100 kPa or more. The upper limit of the water entry pressure of the waterproof membrane 3 that is a porous membrane is for example 300 kPa or less. The water entry pressure of the waterproof membrane 3 that is a microporous membrane may be 100 kPa or more, 200 kPa or more, 300 kPa or more, or even 400 kPa or more. The upper limit of the water entry pressure of the waterproof membrane 3 that is a microporous membrane is for example 2500 kPa or less. The water entry pressure of the waterproof membrane 3 that is a non-porous membrane may be 400 kPa or more, 700 kPa or more, 1100 kPa or more, or even 1500 kPa or more. The upper limit of the water entry pressure of the waterproof membrane 3 that is a non-porous membrane is not limited, and is, for example, 2500 kPa or less. The water entry pressure of the waterproof membrane 3 can be measured as follows according to Method A (low water pressure method) or Method B (high water pressure method) of the water resistance test in JIS L1092: 2009 using a measurement jig.

An example of the measurement jig is a disc, formed from a metal or a resin, having a diameter of 47 mm and provided with a through hole (having a circular cross section) having a diameter of 1 mm at the center thereof. The metal is for example stainless. The resin is for example polycarbonate. The disc has a thickness sufficient to prevent the disc from deforming due to the water pressure applied upon measurement of a water entry pressure. Measurement of a water entry pressure using the measurement jig can be performed as follows.

A waterproof membrane to be evaluated is fixed to one surface of the measurement jig so as to cover the opening of the through hole of the measurement jig. The fixation is performed such that, during measurement of a water entry pressure, water does not leak from a fixed portion of the membrane. For fixing the waterproof membrane, a double-faced adhesive tape having a water port punched in a center portion thereof with a shape that matches the shape of the opening can be used. The double-faced adhesive tape can be placed between the measurement jig and the waterproof membrane such that the circumference of the water port and the circumference of the opening coincide with each other. Next, the measurement jig having the waterproof membrane fixed thereto is set on a testing device such that the surface opposite to the membrane-fixed surface of the measurement jig is a water pressure application surface to which water pressure is applied during measurement, and a water entry pressure is measured according to Method A (low water pressure method) or Method B (high water pressure method) of the water resistance test in JIS L1092: 2009. The water entry pressure is measured on the basis of the water pressure when water comes out from one spot on the membrane surface of the waterproof membrane. The measured water entry pressure can be regarded as the water entry pressure of the waterproof membrane. As the testing device, a device that has the similar configuration to the water resistance testing device exemplified in JIS L1092: 2009 and that has a test piece attachment structure capable of setting the measurement jig can be used.

In the example shown in FIG. 1A and FIG. 1B, the waterproof membrane 3 is a single-layer membrane. The waterproof membrane 3 may be a laminate of two or more membranes. The waterproof membrane 3 may be a laminate of two or more PTFE membranes.

The waterproof membrane 3 may be a colored membrane. The waterproof membrane 3 may be colored, for example, in gray or black. The gray or black waterproof membrane 3 can be formed, for example, by mixing a gray or black coloring agent with the material forming the membrane. The black coloring agent is, for example, carbon black. A color in the range of 1 to 4 and a color in the range of 5 to 8 as represented by "achromatic color brightness NV" defined in JIS Z8721: 1993 can be defined as "black" and "gray", respectively.

In the example shown in FIGS. 1A and 1B, the conversion element 2 included in the conversion element member 1 is an acoustic conversion element, more specifically, a microphone. The acoustic conversion element that can be included in the conversion element member 1 is not limited to a microphone. The acoustic conversion element may be a speaker. However, according to the study by the present inventors, compared with the case where the acoustic conversion element is a speaker, the acoustic conversion element that is a microphone can exhibit a significant decrease in sound transmission characteristics due to permanent deformation of the waterproof membrane 3 and a significant decrease in sound transmission characteristics in reducing the area of the non-joining portion 31 of the waterproof membrane 3. Thus, in the case where the acoustic conversion element is a microphone, the effects by the present invention are particularly advantageous. In the case where the acoustic conversion element is an element having both functions of a microphone and a speaker, the element is assumed to be a microphone.

The acoustic conversion element of the example shown in FIGS. 1A and 1B is a MEMS. However, the acoustic conversion element is not limited to this example, and may be various elements other than a MEMS, such as an electret condenser microphone (ECM).

Figure 4:
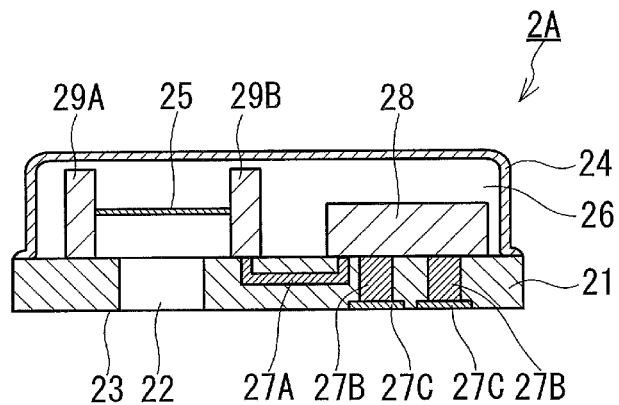
FIG. 4 is a cross-sectional view showing an example of a microelectromechanical system (hereinafter referred to as "MEMS") microphone that can be included in the conversion element member of the present invention.

FIG. 4 shows an example of the MEMS microphone 2A. The MEMS microphone 2A in FIG. 4 includes the substrate 21 and a cap 24 that is joined to a peripheral portion on one of the surfaces of the substrate 21. The substrate 21 is, for example, a semiconductor substrate formed from silicon (Si), a compound semiconductor, or the like. The cap 24 is formed from, for example, a metal, a resin, or a composite material of them. The opening 22 that is a sound-transmitting port is provided in the outer surface of the substrate 21. In a space 26 between the substrate 21 and the cap 24, a diaphragm 25 converting sound transmitted through the opening 22 into mechanical vibration is placed in the vicinity of the opening 22. The diaphragm 25 is formed from, for example, a resin. The diaphragm 25 is supported by a pair of support columns 29A, 29B extending from the one surface of the substrate 21 toward the space 26. Inside the support columns 29A, 29B, semiconductor circuits converting mechanical vibration of the diaphragm 25 into an electric signal are formed. Mechanical vibration generated in the diaphragm 25 by transmission of sound is transmitted to the support columns 29A, 29B to be converted into an electric signal. The converted electric signal is output outside the MEMS microphone 2A via an electrical path including a connector 27A, a preamplifier 28, through electrodes 27B, and terminals 27C.

Figure 5:
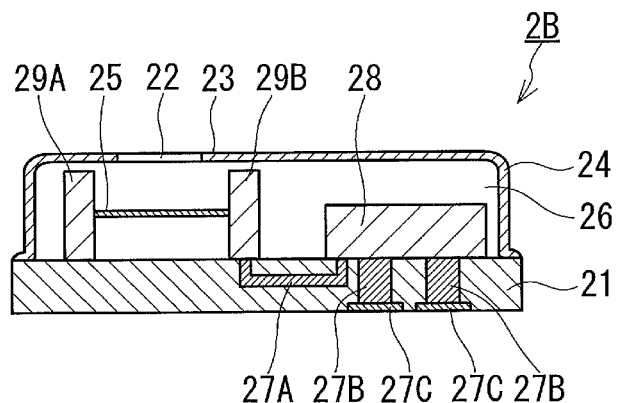
FIG. 5 is a cross-sectional view showing an example of the MEMS microphone that can be included in the conversion element member of the present invention.

The MEMS microphone 2A shown in FIG. 4 is a so-called element with "a sound hole at a lower position" in which the opening 22 and the terminals 27C are formed on the same surface of the element (the outer surface 23 of the substrate 21 in the example in FIG. 4). The MEMS microphone 2A may be a so-called element with "a sound hole at a higher position" in which the opening 22 and the terminals 27C are respectively placed on one of surfaces of the element and the other surface opposite to the one surface. FIG. 5 shows an example of a MEMS microphone 2B with a sound hole at a higher position. The MEMS microphone 2B in FIG. 5 has the same configuration as the MEMS microphone 2A in FIG. 4, except that the opening 22 is provided in not the substrate 21 but the cap 24. In the MEMS microphone 2B in FIG. 5, a surface of the cap 24 that is exposed outside is the above-described outer surface 23.

The MEMS microphones 2A, 2B can be formed by known MEMS technologies including semiconductor processing technologies, thin film forming technologies, and the like.

The configuration of the acoustic conversion element that can be included in the conversion element member 1 is not limited to the above examples. The acoustic conversion element can have any configuration as long as the acoustic conversion element has the outer surface 23 in which the opening 22 is provided. Also, a known element can be used as the acoustic conversion element.

In the example shown in FIGS. 1A and 1B, the opening 22 is circular when viewed in the direction perpendicular to the outer surface 23. However, the shape of the opening 22 is not limited to this example, and may be a circle (including a substantially circular shape), an ellipse (including a substantially elliptical shape), a polygon including a square and a rectangle, or an irregular shape when viewed in the direction perpendicular to the outer surface 23.

The area of the opening 22 when viewed in the direction perpendicular to the outer surface 23 is, for example, 12.6 mm$^2$ or less, and may be 7.1 mm$^2$ or less, 4.9 mm$^2$ or less, 3.1 mm$^2$ or less, or even 1.8 mm$^2$ or less. In the case where the opening 22 has a circular shape when viewed in the direction perpendicular to the outer surface 23, the above areas correspond to respective areas of the opening 22 having circular diameters of 4 mm, 3 mm, 2.5 mm, 2 mm, and 1.5 mm, respectively. The opening 22 having a small area for example suppresses the degree to which the waterproof membrane 3 is indented into the opening 22 due to water pressure is suppressed. Thus, the effects by the present invention can be achieved more reliably.

The area of the opening 22 when viewed in the direction perpendicular to the outer surface 23 is normally small compared with the area of the non-joining portion 31 of the waterproof membrane 3.

The conversion element member 1 including an acoustic conversion element as the conversion element 2 can have good sound transmission characteristics. In the conversion element member 1, an insertion loss due to the waterproof membrane 3 for sound having a frequency of 1 kHz (hereinafter, "insertion loss due to the waterproof membrane 3" is simply referred to as "insertion loss") is, for example, 4.0 dB or less, and may be 3.0 dB or less, 2.5 dB or less, 2.0 dB or less, 1.5 dB or less, or even 1.0 dB or less. Also, an insertion loss for sound having a frequency of 10 kHz is, for example, 4.0 dB or less, and may be 3.0 dB or less, 2.5 dB or less, 2.0 dB or less, 1.5 dB or less, or even 1.0 dB or less. In this case, the waterproof membrane 3 is typically a porous membrane. The insertion loss can be evaluated by using the acoustic conversion element included in the conversion element member 1 as a microphone or speaker for evaluation.

The conversion element member 1 including an acoustic conversion element as the conversion element 2 can have good sound transmission characteristics even after water pressure application. In the conversion element member 1, an insertion loss for sound having a frequency of 1 kHz after a water pressure retention test at a water pressure of 60 kPa or 80 kPa for a water pressure application time of 20 minutes is, for example, 4.0 dB or less, and may be 3.0 dB or less, 2.5 dB or less, 2.0 dB or less, 1.5 dB or less, or even 1.0 dB or less. Also, an insertion loss for sound having a frequency of 10 kHz after a water pressure retention test at a water pressure of 60 kPa or 80 kPa for a water pressure application time of 20 minutes is, for example, 4.0 dB or less, and may be 3.0 dB or less, 2.5 dB or less, 2.0 dB or less, 1.5 dB or less, or even 1.0 dB or less. In this case, the waterproof membrane 3 is typically a porous membrane.

The water pressure retention test is a test in which a constant water pressure is applied to the conversion element member 1 for a fixed time (water pressure application time).

The water pressure retention test can be performed using the measurement jig and the water resistance testing device for measuring the water entry pressure of the waterproof membrane 3. More specifically, the measurement jig having the conversion element member 1 to be evaluated fixed thereto instead of the single waterproof membrane 3 may be set on the testing device, such that the surface of the measurement jig opposite to the surface of the measurement jig to which the conversion element member 1 is fixed is a water pressure application surface, and a constant water pressure may be applied to the conversion element member 1 for a fixed time. The cross-sectional shape and area of the through hole of the measurement jig are set to be the same as the shape and area of the non-joining portion 31 of the waterproof membrane 3 when viewed in the direction perpendicular to the outer surface 23 of the conversion element member 1. Also, the fixation of the conversion element member 1 to the measurement jig is performed, such that the non-joining portion 31 of the waterproof membrane 3 is exposed to the through hole of the measurement jig and such that the entire through hole of the measurement jig and the entire non-joining portion 31 overlap each other when viewed in the direction perpendicular to the outer surface 23. In the test, water pressure is applied to the conversion element member 1 from the waterproof membrane 3 side.

With respect to the conversion element member 1 including an acoustic conversion element as the conversion element 2, the degree of decrease in sound transmission characteristics due to water pressure can be evaluated based on the degree of decrease in sound transmission characteristics (the change amount of insertion loss) determined from the insertion losses before and after the water pressure retention test. The change amount of insertion loss corresponds to a value L2−L1 obtained by subtracting an insertion loss L1 before the water pressure retention test (an insertion loss for 1 kHz sound, for example) from an insertion loss L2 after the water pressure retention test (an insertion loss for 1 kHz sound, for example).

The change amount of insertion loss between before and after the water pressure retention test (at a water pressure of 60 kPa or 80 kPa for a water pressure application time of 20 minutes) (calculated based on the insertion losses at 1 kHz) is, for example, 2.0 dB or less, and may be 1.5 dB or less, 1.3 dB or less, 1.2 dB or less, 1.1 dB or less, or even 1.0 dB or less. Also, the change amount of insertion loss between before and after the water pressure retention test (at a water pressure of 60 kPa or 80 kPa for a water pressure application time of 20 minutes) (calculated based on the insertion losses at 10 kHz) is, for example, 5.0 dB or less, and may be 4.5 dB or less, 4.0 dB or less, 3.5 dB or less, 3.0 dB or less, 2.5 dB or less, 2.0 dB or less, 1.5 dB or less, or even 1.0 dB or less.

The conversion element member 1 including an acoustic conversion element as the conversion element 2 can have good sound transmission characteristics even when the area of the non-joining portion 31 of the waterproof membrane 3 is reduced. The insertion loss normally increases as the area of the non-joining portion 31 decreases. When the area of the non-joining portion 31 of the waterproof membrane 3 is 19.6 mm$^2$, 12.6 mm$^2$, 7.1 mm$^2$, 4.9 mm$^2$, 3.1 mm$^2$, or 1.8 mm$^2$, the conversion element member 1 can exhibit an insertion loss and/or a change amount of insertion loss within the above ranges. Also, when the area of the non-joining portion 31 of the waterproof membrane 3 is 19.6 mm$^2$ or more, 12.6 mm$^2$ or more, 7.1 mm$^2$ or more, 4.9 mm$^2$ or more, 3.1 mm$^2$ or more, or 1.8 mm$^2$ or more, the conversion element member 1 can exhibit an insertion loss and/or a change amount of insertion loss within the above ranges.

In the case where the conversion element member 1 does not have a configuration for enhancing the water entry pressure of the conversion element member 1, the water entry pressure of the conversion element member 1 is normally the same as the water entry pressure of the waterproof membrane 3. The water entry pressure of the conversion element member 1 can be measured in accordance with the above-described method for measuring the water entry pressure of the waterproof membrane 3. However, the measurement jig having the conversion element member 1 to be evaluated fixed thereto instead of the single waterproof membrane 3 is set on a testing device, such that the surface opposite to the surface of the measurement jig to which the conversion element member 1 is fixed is a water pressure application surface. Also, the fixation of the conversion element member 1 to the measurement jig is performed such that the non-joining portion 31 of the waterproof membrane 3 is exposed to the through hole of the measurement jig. In the measurement, water pressure is applied to the conversion element member 1 from the waterproof membrane 3 side.

Figure 6A:
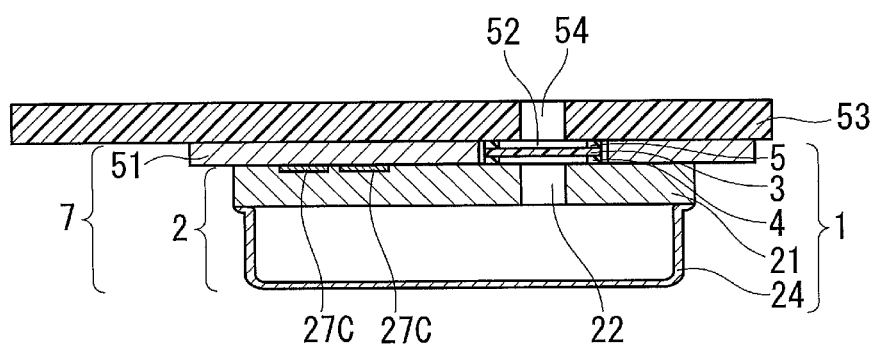
FIG. 6A is a cross-sectional view showing an example of a state in which the conversion element member of the present invention is placed in a housing of an electronic device.
Figure 6B:
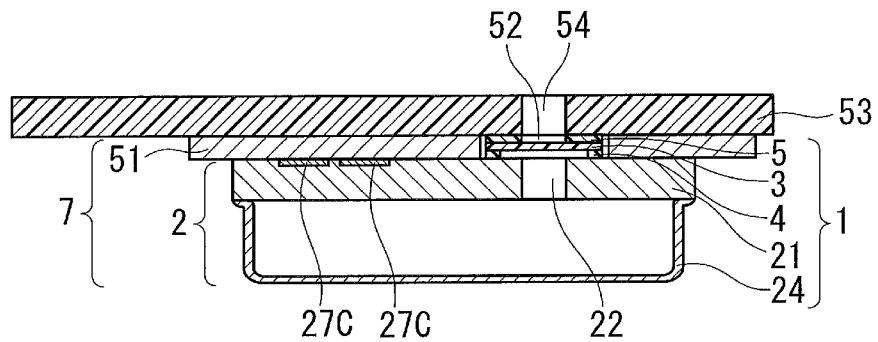
FIG. 6B is a cross-sectional view showing an example of a state in which the conversion element member of the present invention is placed in a housing of an electronic device.

The conversion element member 1 for example can be enclosed and used in a housing of an electronic device. The housing encloses therein a sound conversion part performing conversion between an electric signal and sound, and has an external transmission port transmitting sound between the sound conversion part and the outside. FIGS. 6A and 6B show examples of a state in which the conversion element member 1 is placed in the housing of the electronic device. In the examples shown in FIGS. 6A and 6B, the conversion element member 1 is placed in a housing 53, such that sound can be transmitted between the outside of the housing 53 and the conversion element 2 through the opening 22 of the conversion element member 1 and an external transmission port 54 of the housing 53 and such that entry of water from the outside of the housing 53 into the opening 22 through the external transmission port is prevented by the waterproof membrane 3. More specifically, the conversion element member 1 is placed in the housing 53 as described below.

The conversion element member 1 is fixed to a circuit board 51. The circuit board 51 is provided with a transmission port 52 that is a sound-transmitting port. The conversion element member 1 is fixed to the circuit board 51 with the adhesive portion 4 and the waterproof membrane 3 inserted into the transmission port 52. In the examples shown in FIGS. 6A and 6B, sound can be transmitted through the opening 22, the waterproof membrane 3, and the transmission port 52 of the circuit board 51 while the conversion element member 1 is fixed to the circuit board 51. Also, in the examples shown in FIGS. 6A and 6B, the opening 22 and the external transmission port 54 have the same shape and area and overlap each other, when viewed in a direction perpendicular to a main surface of the circuit board 51. The entire opening 22 and the entire external transmission port 54 may overlap each other, when viewed in the direction perpendicular to the main surface of the circuit board 51. The transmission port 52 has a larger area than the opening 22 and the external transmission port 54 and overlap the opening 22 and the external transmission port 54, when viewed in the direction perpendicular to the main surface of the circuit board 51. Also, a seal 5 is provided on a surface of the waterproof membrane 3 opposite to a surface on the conversion element 2 side of the waterproof membrane 3. The seal 5 prevents a foreign substance such as water from entering the housing 53 through a gap between the circuit board 51 and the housing

53. The seal 5 is in contact with an inner surface of the housing 53. In the example shown in FIG. 6A, the seal 5 has the shape of the peripheral portion of the waterproof membrane 3 when viewed in the direction perpendicular to the main surface of the waterproof membrane 3. Also, in the example, the seal 5 has the same shape and area as the joining portion 41 and the adhesive portion 4 when viewed in the direction perpendicular to the main surface of the waterproof membrane 3. Meanwhile, in the example shown in FIG. 6B, the seal 5 has a shape surrounding the external transmission port 54 and has an inner circumference that coincides with a circumference of the external transmission port 54, when viewed in the direction perpendicular to the main surface of the waterproof membrane 3. Also, in the example, the seal 5 has a larger area than the joining portion 41 and the adhesive portion 4 when viewed in the direction perpendicular to the main surface of the waterproof membrane 3. On a surface of the circuit board 51 to which the conversion element member 1 is fixed, terminals that are electrically connectable to the terminals 27C of the conversion element member 1 are provided. In a state where the conversion element member 1 is fixed to the circuit board 51, transmission and reception of an electric signal can be performed between the conversion element member 1 and the circuit board 51 via the respective terminals. The configuration of the circuit board 51 is not limited as long as transmission and reception of an electric signal to and from the conversion element member 1 can be performed. In addition, the method of fixing (mounting) the conversion element member 1 to the circuit board 51 is not limited to the methods shown in FIGS. 6A and 6B.

The circuit board 51, on which the conversion element member 1 is mounted, is placed in the housing 53, such that sound can be transmitted between the conversion element member 1 and the outside of the housing 53 through the opening 22, the transmission port 52, and the external transmission port 54 and such that entry of water from the outside of the housing 53 into the opening 22 through the external transmission port 54 is prevented by the waterproof membrane 3.

Figure 7:
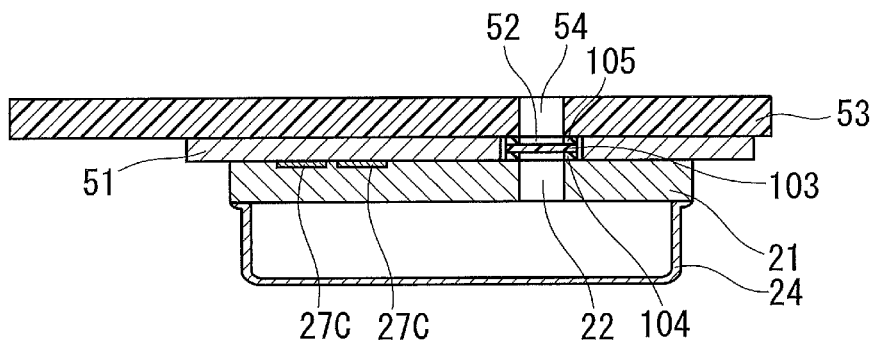
FIG. 7 is a cross-sectional view showing a state in which a conversion element and a waterproof membrane are placed in a housing of an electronic device based on a conventional technical idea.

A waterproof membrane having a non-joining portion with a smaller area can achieve its waterproofness more easily. For this reason, an embodiment shown in FIG. 7 has been conventionally adopted. In the embodiment shown in FIG. 7, an adhesive portion 104 has a shape surrounding the opening 22 when viewed in the direction perpendicular to a main surface of a waterproof membrane 103, and the adhesive portion 104 has an inner circumference that coincides with the shape of the opening 22. Also, a seal 105 has a shape surrounding the external transmission port 54 when viewed in the direction perpendicular to the main surface of the circuit board 51, and the seal 105 has an inner circumference that coincides with the circumference of the external transmission port 54. In the state shown in FIG. 7, the waterproof membrane 103 has no region corresponding to the above region 32. In the state shown in FIG. 7, the shape of the non-joining portion of the waterproof membrane 103 is caused to coincide with the respective shapes of the opening 22 and the external transmission port 54, thereby achieving an improvement in waterproofness of the waterproof membrane 103 alone owing to area reduction by the coinciding portion. Also, in the embodiment shown in FIG. 7, it is normal that the waterproof membrane 103 is handled as a laminate of the adhesive portion 104 and the seal 105 and the waterproof membrane 103 is placed as the laminate between the substrate 21 and the housing 53. In this case, the area of the waterproof membrane 103 is reduced as much as possible to the extent that the waterproof membrane 103 can cover the opening 22 and the external transmission port 54, thus to enhance the rigidity of the laminate during handling. This suppresses unintentional distortion and deformation of the waterproof membrane 103 during placement, thereby improving the waterproofness and characteristics of the waterproof membrane 3 alone. In addition, the opening 52 of the circuit board 51 is designed to have the minimum area enough to accommodate the above laminate, too, from the viewpoint of waterproofness.

The seal 5 can have the configuration described above in the description of the adhesive portion 4. However, the seal 5 may or may not have an adhesiveness. The seal 5 may be formed from a resin elastic body such as a foam, for example. In this case, for example, in the examples shown in FIGS. 6A and 6B, by setting the total thickness of the adhesive portion 4, the waterproof membrane 3, and the seal 5 to be larger than the thickness of the circuit board 51 (the depth of the transmission port 52), the conversion element member 1 can be fixed to the circuit board 51 with the seal 5 compressed in the thickness direction. This can enhance the sealing characteristics of the seal 5. Note that the fixation of the conversion element member 1 to the circuit board 51 with the seal 5 compressed in the thickness direction can be achieved in examples other than those shown in FIGS. 6A and 6B.

The state in which the conversion element member 1 including an acoustic conversion element is placed in the housing 53 of the electronic device is not limited to the examples shown in FIGS. 6A and 6B, as long as sound can be transmitted between the outside of the housing 53 and the conversion element 2 through the opening 22 and the external transmission port 54 and entry of water into the housing 53 and the conversion element 2 can be prevented by the waterproof membrane 3. Also, the conversion element member 1 can be placed in the housing 53 by using any member, as long as the above transmission of sound and prevention of water entry can be achieved.

Figure 8:
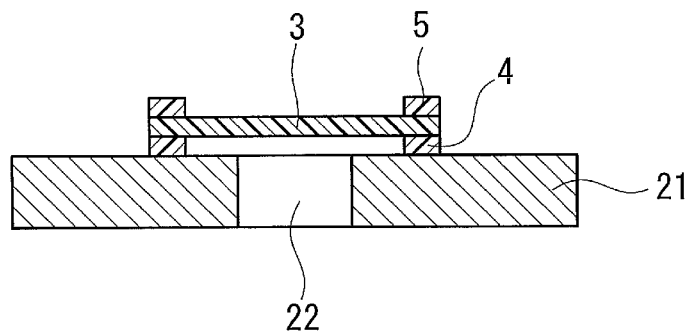
FIG. 8 is a cross-sectional view schematically showing the vicinity between the opening of the conversion element and the waterproof membrane in an example of the conversion element member of the present invention.
Figure 9:
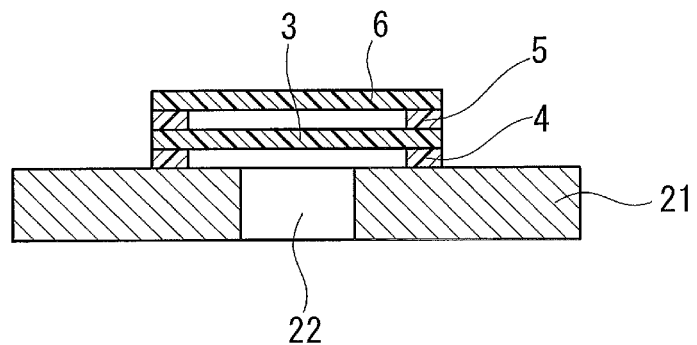
FIG. 9 is a cross-sectional view schematically showing the vicinity between the opening of the conversion element and the waterproof membrane in an example of the conversion element member of the present invention.

In the conversion element member of the present invention, the seal 5 may be placed on the surface of the waterproof membrane 3 opposite to the surface on the conversion element 2 side of the waterproof membrane 3, and the conversion element member in this state also can be distributed. FIG. 8 shows an example of the conversion element member 1 in which the seal 5 is placed. In FIG. 8, the vicinity of the waterproof membrane 3 and the opening 22 in this example is shown. Also, a separator 6 for protecting the seal 5 and the non-joining portion 31 of the waterproof membrane 3 may be further placed, and the conversion element member 1 in this state also can be distributed. FIG. 9 shows an example of the conversion element member 1 in which the seal 5 and the separator 6 are placed. In FIG. 9, the vicinity of the waterproof membrane 3 and the opening 22 in this example is shown. The separator 6 can be a known separator formed from paper, a resin, a metal, or a composite material of them. For example, a separator for an adhesive tape can be used. The separator 6 may have adhesiveness on its surface in contact with the seal 5. When the conversion element member 1 is used, the separator 6 is peeled off.

The conversion element member 1 can include any member other than those described above as long as the effects of the present invention can be obtained.

The conversion element member 1 can be formed so as to cover the opening 22, by placing and joining the waterproof membrane 3 on the outer surface 23 of the conversion element 2 in which the opening 22 is provided, at the joining portion 41 having the shape surrounding the opening 22 when viewed in the direction perpendicular to the outer surface 23. The waterproof membrane 3 is placed and joined such that the non-joining portion 31 of the waterproof membrane 3 has the region 32 overlapping the outer surface 23 when viewed in the above direction.

Conversion Element Module

It is possible to distribute or use the conversion element member 1, in the state of being mounted on the circuit board 51, together with the circuit board 51, in other words, as a conversion element module 7 including the conversion element member 1 and the circuit board 51 with the conversion element member 1 mounted thereon.

The conversion element member 1 included in the conversion element module 7 is the conversion element member of the present invention, and is, for example, the conversion element members 1 described in the above-described examples. However, the conversion element member 1 included in the conversion element module 7 is not limited to those described in the above-described examples as long as the conversion element member 1 is the conversion element member of the present invention.

Figure 10A:
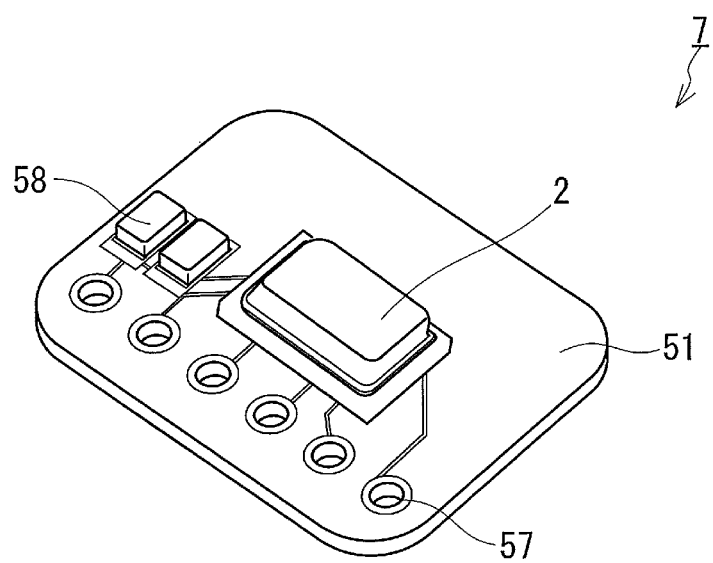
FIG. 10A is a perspective view showing an example of a conversion element module of the present invention.
Figure 10B:
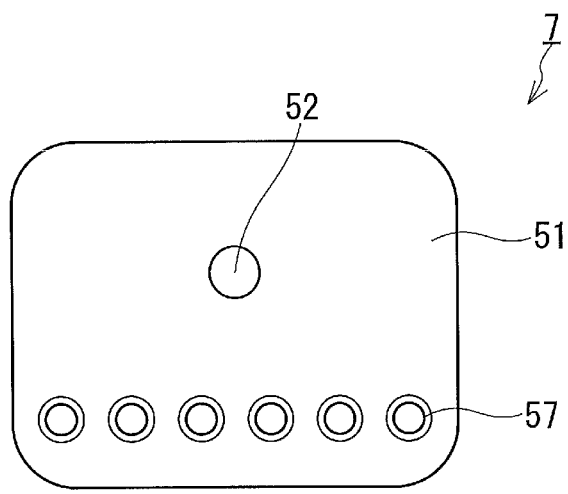
FIG. 10B is a plan view showing the example of the conversion element module of the present invention.

The circuit board 51 included in the conversion element module 7 is not limited as long as transmission and reception of an electric signal to and from the conversion element member 1 mounted on the circuit board 51 can be performed. The circuit board 51 may be a circuit board on which a minimal electronic circuit is formed for transmitting and receiving an electric signal from and/or to the conversion element member 1, typically an electric signal output from the conversion element 2 included in the conversion element member 1, and/or an electric signal input to the conversion element 2. Alternatively, the circuit board 51 may be a circuit board further including various electronic circuits and/or elements and the like capable of performing various processes on the electric signal. FIGS. 10A and 10B show an example of the conversion element module 7. FIG. 10B is a plan view of the conversion element module 7 shown in FIG. 10A, as viewed from a surface of the circuit board 51 opposite to the surface of the circuit board 51 on which the conversion element member 1 is mounted. As shown in FIG. 10B, the transmission port 52 is provided in the opposite surface of the circuit board 51. In FIG. 10A, reference numeral 57 denotes terminals, and reference numeral 58 denotes elements such as resistance elements or diode elements.

Example of mounting the conversion element member 1 on the circuit board 51 are shown in FIGS. 6A and 6B. As shown in FIGS. 6A and 6B, the circuit board 51 has the transmission port 52 allowing sound to be transmitted to and from the opening 22 of the conversion element 2, and the conversion element member 1 may be fixed to the circuit board 51 with the waterproof membrane 3 inserted into the transmission port 52. However, the embodiment of mounting the conversion element member 1 on the circuit board 51 is not limited to the above examples.

Electronic Device

Figure 11:
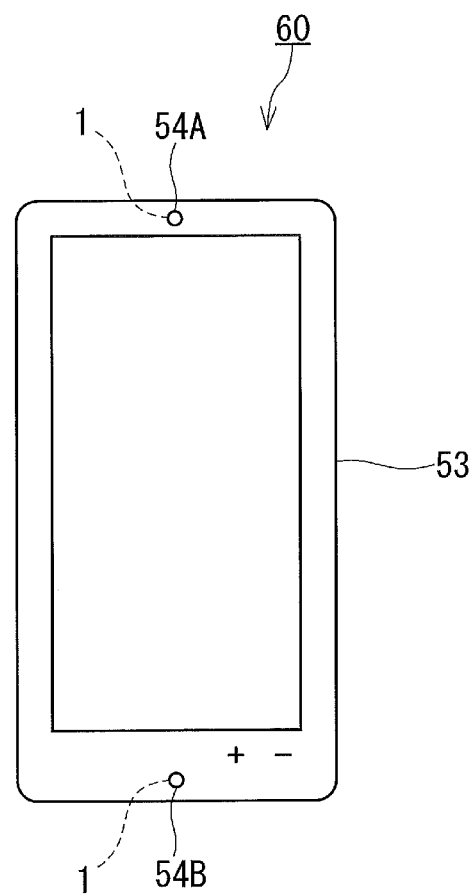
FIG. 11 is a plan view showing an example of an electronic device of the present invention.

FIG. 11 shows an example of an electronic device in which the conversion element member 1 is used. The electronic device shown in FIG. 11 is a smartphone 60. Inside the housing 53 of the smartphone 60, a sound conversion part performing conversion between an electric signal and sound is placed. The sound conversion part includes the conversion element 2 that is an acoustic conversion element having a function of a speaker and/or a microphone. The conversion element 2 may be a microphone. The housing 53 is provided with an opening 54A and an opening 54B that are external transmission ports.

The sound conversion part in the smartphone 60 includes the conversion element 2, as the conversion element member 1 and/or the conversion element module 7. In the smartphone 60, the conversion element member 1 and/or the conversion element module 7 is placed in the housing 53, such that sound can be transmitted between the opening 22 of the conversion element 2 and the outside of the housing 53 through the external transmission port 54 of the housing 53 and such that entry of water from the outside into the opening 22 through the external transmission port 54 is prevented by the waterproof membrane 3. Note that the examples of the state in which the conversion element member 1 or the conversion element module 7 is placed in the housing 53 are shown in FIGS. 6A and 6B.

In the case where the waterproof membrane 3 has air permeability in the thickness direction thereof, the conversion element 2 may be, for example, a characteristics conversion element performing conversion between characteristics of gas and an electric signal. The characteristics conversion element has the opening 22 that can function as a ventilation port transmitting (communicating) a gas. The characteristics of the gas refer to, for example, the pressure, the flow rate, or the concentration of a specific gas species (such as $O_2$). However, the characteristics of the gas are not limited to the above examples. The conversion element member 1 including a characteristics conversion element as the conversion element 2 can for example be used for electronic devices that are sensor devices such as a pressure sensor, a flow rate sensor, and an $O_2$ concentration sensor. However, the application of the conversion element member 1 is not limited to the above examples.

In the case where the conversion element 2 is a characteristics conversion element, the waterproof membrane 3 is required to prevent entry of water while permitting gas to pass therethrough. In this case, the waterproof membrane 3 may be a porous membrane. Also, in this case, a portion of the waterproof membrane 3 through which gas mainly passes is the non-joining portion 31.

In the case where water pressure is applied to the waterproof membrane 3 of the conversion element member 1 including a characteristics conversion element as the conversion element 2 in the direction to the element, deformation of the waterproof membrane 3 is limited to the elastic deformation range without reaching plastic deformation even when the water pressure applied to the waterproof membrane 3 is large or even when the water pressure is continuously applied to the waterproof membrane 3. In addition, permanent deformation remaining in the waterproof membrane 3 even after release from the water pressure decreases the air-permeability characteristics of the conversion element member 1, and, for example, variation in air permeability occurs, or deviation from the air-permeability characteristics designed for the conversion element member 1 occurs. For example, in the case where the electronic device is a sensor device such as a pressure sensor, variation in air permeability and deviation from the designed air-permeability characteristics may adversely affect the performance of the device. In the conversion element member 1, deformation of the waterproof membrane 3 due to water pressure is limited within the elastic deformation range, thereby suppressing the variation in air permeability, deviation from the designed air-permeability characteristics, and the like due to water pressure application described above.

The conversion element member 1 including a characteristics conversion element as the conversion element 2 can be placed in the housing 53, such that, for example, gas can be transmitted (communicated) between the housing 53 of the electronic device and the opening (ventilation port) 22 of the conversion element 2 through the external transmission port 54 of the housing 53 and such that entry of water from the outside into the opening 22 through the external transmission port 54 is prevented by the waterproof membrane 3. Note that the electronic device in which the conversion element member 1 is placed does not need to include the sound conversion part. Alternatively, the electronic device in which the conversion element member 1 is placed may be an electronic device including a sound conversion part such as a smartphone. In this case, the conversion element member 1 can be placed in the housing 53 such that water is prevented from entering through the external transmission port 54 that does not correspond to the sound conversion part. The external transmission port 54, which does not correspond to the sound conversion part, is, for example, a ventilation port through which sound is not intended to pass in the design of the electronic device (sound is permitted to pass through this ventilation port), and is more specifically, a pressure measurement port, a flow rate measurement port, or a concentration measurement port, for example.

The conversion element 2 that can be included in the conversion element member 1 of the present invention is not limited to the acoustic conversion element and the characteristics conversion element described above, as long as the conversion element 2 has an opening that can function as a ventilation port and/or a sound-transmitting port.

Examples of the electronic device including the conversion element member 1 and/or the conversion element module 7 include: wearable devices such as a smart watch and a wristband; various cameras including an action camera and a security camera; communication devices such as a mobile phone and a smartphone; virtual reality (VR) devices; augmented reality (AR) devices; and sensor devices. However, the electronic device is not limited to the above examples.

EXAMPLES

Hereinafter, the present invention will be described more specifically by way of the following Examples. The present invention is not limited to the following Examples.

Preparation of Waterproof Membranes

The following five kinds of waterproof membranes A to E were prepared as waterproof membranes.

Waterproof Membrane A

After uniform mixing of 100 parts by weight of PTFE fine powder (POLYFLON F-104 manufactured by Daikin Industries, Ltd.) with 20 parts by weight of a liquid lubricant (n-dodecane manufactured by Japan Energy Corporation), the obtained mixture was compressed into a cylinder and then was extruded by a ram extruder. Thus, a sheet molded body extending in the longitudinal direction was obtained. The sheet molded body containing the liquid lubricant was passed between metal pressure rolls to be rolled so as to have a thickness of 0.2 mm. Then, the sheet molded body was heated to 150° C. to remove the liquid lubricant, and thus was dried. Then, the sheet molded body was stretched in the longitudinal direction at 300° C. at a stretch ratio of 2.5 times, and was stretched in the width direction at 200° C. at a stretch ratio of 20 times. Then, the sheet molded body was sintered at 400° C., which is a temperature equal to or higher than the melting point of PTFE.

Thus, a waterproof membrane A that is a porous PTFE membrane having a membrane thickness of 15 μm and an average pore diameter of 0.32 μm was obtained.

Waterproof Membrane B

A sheet molded body having a thickness of 0.2 mm (before removal of a liquid lubricant) obtained in the same manner as in production of the waterproof membrane A was stretched in the width direction at 25° C. at a stretch ratio of 4.5 times. Next, the sheet molded body, which was stretched, was heated to 150° C. to remove the liquid lubricant, and thus was dried. Then, the sheet molded body was stretched in the longitudinal direction at 300° C. at a stretch ratio of 2.0 times, and was stretched in the width direction at 100° C. at a stretch ratio of 20 times. Then, the sheet molded body was sintered at 400° C., which is a temperature equal to or higher than the melting point of PTFE. Thus, a waterproof membrane B that is a porous PTFE membrane having a membrane thickness of 6 μm and an average pore diameter of 0.48 μm was obtained.

Waterproof Membrane C

A waterproof membrane C that is a porous PTFE membrane having a membrane thickness of 25 μm and an average pore diameter of 0.88 μm was obtained in the same manner as the waterproof membrane A, except that the sheet molded body from which the liquid lubricant has been removed was stretched in the longitudinal direction at a stretching temperature of 380° C. at a stretching ratio of 4.5 times, was stretched in the width direction at a stretching temperature of 330° C. at a stretching ratio of 10 times, and was not sintered after being stretched in the width direction.

Waterproof Membrane D

A silicone rubber sheet (thickness of 40 μm, hardness of 65, non-porous membrane, black) was prepared as a waterproof membrane D.

Waterproof Membrane E

A polyurethane sheet (thickness of 10 μm, hardness of 95, non-porous membrane, white) was prepared as a waterproof membrane E.

Characteristics Evaluation of Waterproof Membranes A to E

The waterproof membranes A to E produced above were evaluated for the following characteristics.

Air Permeability in Thickness Direction (Gurley Air Permeability)

The air permeability in the thickness direction of the waterproof membranes was evaluated as air permeability (Gurley air permeability) by the above-described method according to Method B (Gurley method) of air permeability measurement specified in JIS L1096: 2010. As a result of the evaluation, the Gurley air permeabilities of the waterproof membrane A, the waterproof membrane B, and the waterproof membrane C were 1.0 seconds/100 mL, 2.0 seconds/100 mL, and 0.2 seconds/100 mL, respectively. The Gurley air permeabilities of the waterproof membrane D and the waterproof membrane E were more than 10,000 seconds/100 mL.

Evaluation of Indentation Amount X by Indentation Test

Figure 12:
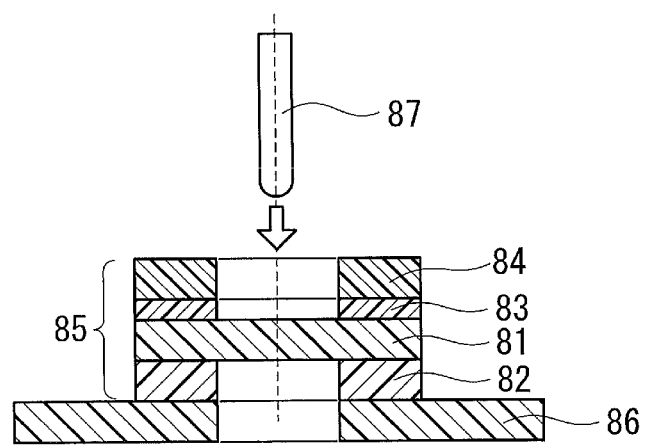
FIG. 12 is a diagram for describing an indentation test on waterproof membranes performed in Examples.

The indentation amount X on the waterproof membranes was evaluated by performing the indentation test described above. More specifically, the indentation amount X was evaluated as follows (see FIG. 12). First, as a testing machine for an indentation test, a precision universal testing machine (AG-5 kNXPlus HS manufactured by Shimadzu Corporation) was prepared that is capable of indenting a probe onto a surface of a membranous test piece at a constant speed. Next, the waterproof membrane to be evaluated was cut out into a circle having a diameter of 5.8 mm to obtain a test piece 81. Next, to one of main surfaces of the test piece 81, a double-faced adhesive tape 82 (a ring shape having an outer diameter of 5.8 mm and an inner diameter of 2.0 mm with a thickness of 200 µm, No. 57120B manufactured by Nitto Denko Corporation) was attached. To the other main surface of the test piece 81, a double-faced adhesive tape 83 (a ring shape having an outer diameter of 5.8 mm and an inner diameter of 2.0 mm with a thickness of 30 µm, No. 5603 manufactured by Nitto Denko Corporation) and a PET sheet 84 (a ring shape having an outer diameter of 5.8 mm and an inner diameter of 2.0 mm with a thickness of 0.1 mm, LUMIRROR manufactured by Toray Industries, Inc.) was attached in this order. Thus, a laminate 85 was obtained. The double-faced adhesive tape 82, the double-faced adhesive tape 83, and the PET sheet 84 were attached to each other with adhesive layers of the double-faced adhesive tapes 82 and 83 interposed therebetween, such that the respective outer circumferences of the members coincided with each other and coincided with the circumference of the test piece 81. Next, the laminate 85 was placed for fixing on a surface of a polycarbonate plate 86 through which a through hole having a diameter of 2.0 mm extends perpendicularly, with the adhesive layer of the double-faced adhesive tape 82 interposed therebetween. The fixation of the laminate 85 was performed such that the inner circumference of the double-faced adhesive tape 82 coincided with the circumference of the through hole of the polycarbonate plate 86 when viewed in a direction perpendicular to the main surface of the test piece 81. Next, the polycarbonate plate 86 and the laminate 85 were fixed to the testing machine such that the polycarbonate plate 86 was positioned below the laminate 85, and an indentation test was performed in which a needle (probe) 87 was indented to the test piece 81 from above at a constant speed. The fixation of the polycarbonate plate 86 and the laminate 85 to the testing machine was performed, such that, in the indentation test, the needle 87 that was caused to pass through the through holes of the double-faced adhesive tape 83 and the PET sheet 84 could be indented to the test piece 81 vertically downward. The needle 87 used was a cylindrical needle (with a diameter of 0.8 mm) having ends one of which has a 0.35 mm radius hemispherical shape to be indented to the test piece 81. The indentation speed of the needle 87 on the test piece 81 was set to 10 mm/min. Also, the evaluation was performed in an atmosphere at a temperature of 25±5° C. and a relative humidity of 60±10%. The indentation test was performed on each of five test pieces 81 cut at different positions of one waterproof membrane. An average value of indentation amounts when respective repulsive forces generated in the test pieces by indentation of the probe reach the maximum value obtained for the test pieces was determined as an indentation amount X. Also, the maximum value of the respective repulsive force in each of the waterproof membranes to be evaluated was obtained as an average value of the values obtained for the above five test pieces. The evaluation results are shown in Table 1 below.

TABLE 1

| | Indentation amount X (mm) | Maximum value of repulsive force (N) |
|---|---|---|
| Waterproof membrane A | 0.72 | 0.36 |
| Waterproof membrane B | 0.68 | 0.28 |
| Waterproof membrane C | 0.78 | 0.53 |
| Waterproof membrane D | 1.30 | 0.37 |
| Waterproof membrane E | 1.71 | 0.83 |

Characteristics Evaluation as Conversion Element Member

Relationship Between Spacing Distance D1 and Sound Transmission Characteristics (Insertion Loss)

The relationship between the spacing distance D1 and sound transmission characteristics (insertion loss) was evaluated by using the waterproof membranes A, B, D, and E produced above and a MEMS microphone (SPU 0410LR5H manufactured by Knowles) prepared separately. A specific evaluation method is as follows.

First, the waterproof membrane was cut out into a circle having a diameter of 5.8 mm. Next, to one of main surfaces of the cut waterproof membrane, a double-faced adhesive tape A (a ring shape having an outer diameter of 5.8 mm and an inner diameter of 2.0 mm with a thickness of 200 µm, No. 57120B manufactured by Nitto Denko Corporation) was attached. To the other main surface, a plurality of laminated products were attached, each of which includes a double-faced adhesive tape B (a ring shape having an outer diameter of 5.8 mm and an inner diameter of 2.0 mm with a thickness of 30 µm, No. 5603 manufactured by Nitto Denko Corporation) and a PET sheet (a ring shape having an outer diameter of 5.8 mm and an inner diameter of 2.0 mm with a thickness of 0.1 mm, LUMIRROR manufactured by Toray Industries, Inc.). Thus, a sample for evaluation was obtained. The attachment of the double-faced adhesive tape A, the double-faced adhesive tape B, and the PET sheet was performed with the adhesive layers of the double-faced adhesive tapes A and B interposed therebetween, such that the outer circumferences of the respective members coincided with each other and coincided with the circumference of the waterproof membrane. Also, the attachment of the laminated products was performed such that the double-faced adhesive tape B was in contact with the waterproof membrane. The laminated products of the PET sheet and the double-faced adhesive tape B were used as the adhesive portion 4 and as the spacer 42 adjusting the spacing distance D1. In the case where three laminated products are used, the spacing distance D1 when combined with the MEMS microphone is 0.4 mm, that is, the spacing distance D1 is equal to or lower than the indentation amounts X on the waterproof membranes A and B. In the case where eight laminated products are used, the spacing distance D1 when combined with the MEMS microphone is 1.0 mm, that is, the spacing distance D1 exceeds the indentation amounts X on the waterproof membranes A and B. Accordingly, according to the above samples, it is possible to prepare Examples 1 and 2 having a spacing distance D1 of 0.4 mm when combined with the MEMS microphone and Comparative Examples 1 and 2 having a spacing distance D1 of 1.0 mm when combined with the MEMS microphone. Examples 3 and 4 and Comparative Examples 3 and 4 were prepared in the same manner by varying the thickness of the PET sheet as necessary. Table 2 below shows the combination of the waterproof membrane, the indentation amount X, and the spacing distance D1 in each of the Examples and Comparative Examples.

TABLE 2

| | Waterproof membrane | Indentation amount X on waterproof membrane (mm) | Spacing distance D1 (mm) |
|---|---|---|---|
| Example 1 | A | 0.72 | 0.4 |
| Comparative Example 1 | | | 1.0 |
| Example 2 | B | 0.68 | 0.4 |
| Comparative Example 2 | | | 1.0 |
| Example 3 | D | 1.30 | 0.2 |
| Comparative Example 3 | | | 1.4 |
| Example 4 | E | 1.71 | 0.4 |
| Comparative Example 4 | | | 1.8 |

Figure 13:
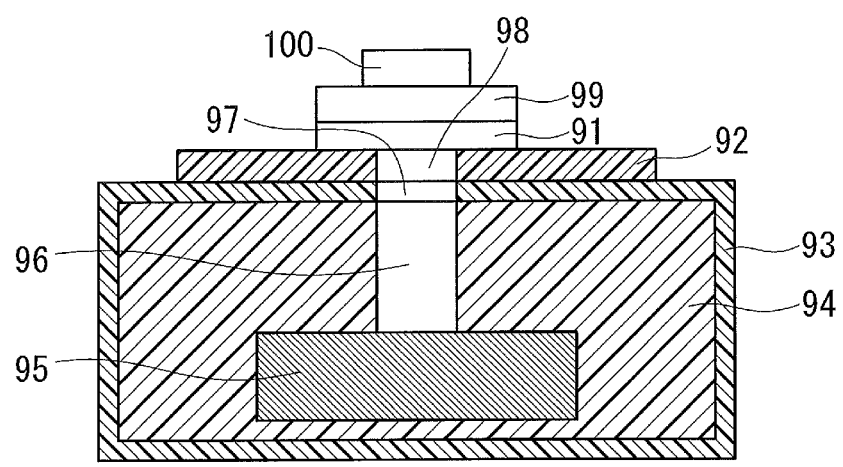
FIG. 13 is a diagram for describing an evaluation method of sound transmission characteristics on conversion element members performed in Examples.

Next, an evaluation jig 93 for use in insertion loss evaluation was prepared (see FIG. 13). The evaluation jig 93 is a resin box provided with a sound-transmitting port (a circular shape having a diameter of 2 mm) 97 in an upper surface thereof. Inside the evaluation jig 93, a filler 94 and a speaker (SCC-16A manufactured by STAR MICRONICS CO., LTD.) 95 are placed. The speaker 95 is surrounded by the filler 94. The filler 94 is provided with a cylindrical sound-transmitting path 96 having a diameter of 2 mm and extending from an upper surface of the filler 94 to the speaker 95. Sound output from the speaker 95 can be output outside the evaluation jig 93 through the sound-transmitting path 96 and the sound-transmitting port 97. The filler 94 is formed from a foamed resin, and is placed in the evaluation jig 93 for the purpose of preventing sound output from the speaker 95 from being transmitted outside the evaluation jig 93 through a portion other than the sound-transmitting path 96 and the sound-transmitting port 97. Next, a polycarbonate spacer 92 provided with a circular through hole 98 having a diameter of 2 mm in the center thereof was fixed to the upper surface of the prepared evaluation jig 93. The fixation of the spacer 92 was performed such that the center of the sound-transmitting port 97 and the center of the through hole 98 coincided with each other when viewed in a direction perpendicular to a surface of the spacer 92. Also, an adhesive was used for fixing the spacer 92.

Next, each of the samples 91 produced above was joined to the spacer 92 with an adhesive layer of the double-faced adhesive tape A that is not joined to the waterproof membrane. The joining of the sample 91 to the spacer 92 was performed, such that the conversion element member 91 covered the through hole 98 and such that the center of the through hole 98 coincided with the center of the waterproof membrane when viewed in a direction perpendicular to a main surface of the waterproof membrane. Next, a MEMS microphone 99 was placed on the sample 91, and furthermore a weight 100 having a mass of 340 g was placed on the MEMS microphone 99. The weight 100 was used to allow evaluation of sound transmission characteristics equivalent to those of the conversion element member of the sample 91 and the MEMS microphone 99 joined to each other by bringing the sample 91 and the MEMS microphone 99 into close contact with each other. Also, by allowing evaluation of sound transmission characteristics without joining the sample 91 and the MEMS microphone 99 to each other, the MEMS microphone 99 could be used repeatedly in the evaluation. The placement of the MEMS microphone 99 was performed, such that the outer surface of the MEMS microphone 99 in which the sound-transmitting port was provided was in contact with the PET sheet of the sample 91 and such that the center of the waterproof membrane coincided with the center of the sound-transmitting port when viewed in the direction perpendicular to the main surface of the waterproof membrane. The MEMS microphone 99 prepared was one with a sound hole at a lower position, and the shape of the sound-transmitting port was a circle having a diameter of 1.0 mm when viewed in a direction perpendicular to the outer surface. Also, the outer surface of the MEMS microphone 99 in which the sound-transmitting port was provided was flat over a region of at least about 7 mm square centering on the sound-transmitting port. In a state where the MEMS microphone 99 was placed, a ring-shaped region (having an outer diameter of 2.0 mm and an inner diameter of 1.0 mm) overlapping the outer surface when viewed in the direction perpendicular to the outer surface was formed in a non-joining portion of the waterproof membrane. Also, the distance between a sound output surface of the speaker 95 and the sound-transmitting port of the MEMS microphone 99 was about 21 mm.

Next, the MEMS microphone 99 and the speaker 95 were connected to an acoustic evaluation device (Multi-analyzer System 3560-B-030 manufactured by Brueel & Kjaer Sound & Vibration Measurement A/S). Next, a solid state response (SSR) mode (test signal of 20 Hz to 20 kHz, sweep up) was selected to evaluate the insertion loss due to the sound-transmitting membrane on the above combination of the sound-transmitting membrane and the MEMS microphone. The insertion loss can be automatically determined from a test signal input from the acoustic evaluation device to the speaker 95 and a signal received by the MEMS microphone 99. Prior to evaluating the insertion loss, a value (blank value) of insertion loss in the case where the waterproof membrane was removed from the sample 91 had been determined in advance. The insertion loss in the above combination corresponds to a value obtained by subtracting the blank value from the measured value in the case where the waterproof membrane was included. It can be determined that as the value of insertion loss is lower, the sound transmission characteristics are more excellent.

The evaluation results are shown in Table 3 below. In Table 3, the sign "-" indicates no measurement.

TABLE 3

|  | Spacing distance D1 (mm) | Insertion loss/1 kHz (dB) | Insertion loss/10 kHz (dB) |
| --- | --- | --- | --- |
| Example 1 | 0.4 | −0.14 | 0.90 |
| Comparative Example 1 | 1.0 | 0.37 | — |
| Example 2 | 0.4 | 0.41 | −1.15 |
| Comparative Example 2 | 1.0 | 0.61 | −2.07 |
| Example 3 | 0.2 | 0.75 | 0.39 |
| Comparative Example 3 | 1.4 | 4.28 | 16.48 |
| Example 4 | 0.4 | 0.89 | −1.80 |
| Comparative Example 4 | 1.8 | 2.47 | −1.80 |

As shown in Table 3, the smaller the spacing distance D1 was, the lower the value of the insertion loss for sound having a frequency of 1 kHz was, that is, the better the sound transmission characteristics were. Note that the insertion loss taking a negative value means that the sound pressure at the frequency increased compared with the original sound for evaluation generated from a speaker unit, typically because the waterproof membrane resonates with the sound at the frequency. Accordingly, in evaluating the relationship between the spacing distance D1 and the sound transmission characteristics, when the insertion loss takes a negative value, it can be determined that "the sound transmission characteristics were good at this spacing distance D1" without depending on the value.

Change in Sound Transmission Characteristics (Insertion Loss) Between Before and After Water Pressure Retention Test Next, a water pressure retention test was performed on each of the produced samples 91, and then the insertion loss after the water pressure retention test in combination with the MEMS microphone was evaluated by the method described above in the description of "[Relationship between Separation Distance D1 and Sound Transmission Characteristics (Insertion Loss)]". The water pressure retention test was performed as follows.

The sound transmission characteristics before the water pressure retention test were evaluated, and then the sample 91 together with the spacer 92 were removed from the evaluation jig 93. Next, a polycarbonate support plate having a circular through hole (having a diameter of 1.0 mm) simulating the sound-transmitting port of the MEMS microphone 99 in the center thereof was placed on the surface of the sample 91 opposite to the spacer 92 side, and respective outer circumferences of the spacer 92 and the support plate were sandwiched by a plurality of clips thus to fix them with the sample 91 sandwiched therebetween. The support plate was placed such that the center of the waterproof membrane and the center of the through hole of the support plate coincided with each other when viewed in the direction perpendicular to the main surface of the waterproof membrane. Next, a laminate of the spacer 92, the sample 91 and the support plate was set in the above-described water resistance testing device, and a water pressure retention test was performed in which a constant water pressure was applied to the waterproof membrane for a fixed time. The water pressure was applied from the spacer 92 side. For the waterproof membrane A, the water pressure to be applied was set to 60 kPa and the water pressure application time was set to 20 minutes. For the waterproof membranes B, D and E, the water pressure to be applied was set to 80 kPa and the water pressure application time was set to 20 minutes.

The evaluation results are shown in Table 4 below, together with the degree of decrease in sound transmission characteristics (the change amount of insertion loss) that is a value obtained by subtracting an insertion loss L1 before the water pressure retention test from an insertion loss L2 after the water pressure retention test. In Table 4, the sign "-" indicates no measurement.

TABLE 4

|  | Before water pressure retention test | | After water pressure retention test | | Degree in sound transmission characteristics (Change amount of insertion loss) (dB) | |
| --- | --- | --- | --- | --- | --- | --- |
|  | Insertion loss/1 kHz (dB) | Insertion loss/10 kHz (dB) | Insertion loss/1 kHz (dB) | Insertion loss/10 kHz (dB) | 1 kHz | 10 kHz |
| Example 1 | −0.14 | 0.90 | 0.33 | −0.70 | 0.47 | −1.60 |
| Comparative Example 1 | 0.37 | — | 2.97 | 5.62 | 2.60 | — |
| Example 2 | 0.41 | −1.15 | 1.37 | −0.29 | 0.96 | 0.95 |
| Comparative Example 2 | 0.61 | −2.07 | 3.35 | 6.05 | 2.74 | 8.12 |
| Example 3 | 0.75 | 0.39 | 3.01 | −1.33 | 2.26 | −1.72 |
| Comparative Example 3 | 4.28 | 16.48 | 4.49 | 12.77 | 0.21 | −3.71 |
| Example 4 | 0.89 | −1.80 | 1.36 | −0.41 | 0.47 | 1.39 |
| Comparative Example 4 | 2.47 | −1.80 | 4.68 | 6.28 | 2.22 | 8.08 |

As shown in Table 4, compared with Comparative Examples in which the spacing distance D1 exceeds the indentation amount X on the waterproof membrane, Examples in which the spacing distance D1 is equal to or less than the indentation amount X on the waterproof membrane exhibited a greatly improved degree of decrease in sound transmission characteristics between before and after the water pressure retention and a suppressed degree of increase in insertion loss due to the water pressure retention test. In addition, the suppression of the degree of increase in insertion loss was particularly remarkable for sound in a high frequency range of 10 kHz. Although the change amount of insertion loss in Comparative Example 3 is smaller than that in Example 3, Comparative Example 3 already had a significantly large insertion loss (particularly at a frequency of 10 kHz) before the water pressure retention test.

INDUSTRIAL APPLICABILITY

The technology of the present invention can be applied to various electronic devices including: wearable devices such as a smart watch; various cameras; communication devices such as a mobile phone and a smartphone; and sensor devices.

The invention claimed is:

1. A conversion element member comprising:
a conversion element having an opening capable of functioning as a ventilation port and/or a sound-transmitting port; and
a waterproof membrane, wherein
the conversion element has an outer surface provided with the opening,
the waterproof membrane is joined, at a joining portion thereof, to the outer surface of the conversion element so as to cover the opening, the joining portion having a shape surrounding the opening when viewed in a direction perpendicular to the outer surface,
the waterproof membrane has a non-joining portion defined as a portion surrounded by the joining portion when viewed in the direction perpendicular to the outer surface, the non-joining portion having a region overlapping the outer surface when viewed in the direction, and
a spacing distance D1 between the waterproof membrane and the outer surface in the region is 0.01 mm or more and X mm or less,
where X represents, in an indentation test of a probe on the waterproof membrane performed according to a piercing strength test specified in JIS Z1707: 1997, an indentation amount of the probe when a repulsive force generated in the waterproof membrane by indentation of the probe reaches a maximum value.

2. The conversion element member according to claim 1, wherein
the spacing distance D1 is equal to or less than a smaller value selected from the X mm and 2 mm.

3. The conversion element member according to claim 1, wherein
the spacing distance D1 is equal to or less than 0.6 times the X mm.

4. The conversion element member according to claim 1, wherein
a distance D2 between the joining portion and the opening in the region when viewed in the direction perpendicular to the outer surface is larger than the spacing distance D1.

5. The conversion element member according to claim 1, wherein
a distance D2 between the joining portion and the opening in the region when viewed in the direction perpendicular to the outer surface is 0.5 mm or more.

6. The conversion element member according to claim 1, wherein
an area of the opening of the conversion element when viewed in the direction perpendicular to the outer surface is 1.8 mm$^2$ or less.

7. The conversion element member according to claim 1, wherein
the waterproof membrane includes a polytetrafluoroethylene membrane.

8. The conversion element member according to claim 1, wherein
the conversion element is a microelectromechanical system (MEMS).

9. The conversion element member according to claim 1, wherein
the conversion element is an acoustic conversion element.

10. The conversion element member according to claim 9, wherein
an insertion loss for sound having a frequency of 1 kHz of the waterproof membrane is 3.0 dB or less after a water pressure retention test at a water pressure of 60 kPa or 80 kPa for a water pressure application time of 20 minutes.

11. The conversion element member according to claim 9, wherein
an insertion loss for sound having a frequency of 10 kHz of the waterproof membrane is 3.0 dB or less after a water pressure retention test at a water pressure of 60 kPa or 80 kPa for a water pressure application time of 20 minutes.

12. The conversion element member according to claim 9, wherein
a change amount of insertion loss for sound having a frequency of 1 kHz of the waterproof membrane is 2.0 dB or less between before and after a water pressure retention test at a water pressure of 60 kPa or 80 kPa for a water pressure application time of 20 minutes.

13. A conversion element module comprising:
the conversion element member according to claim 1; and
a circuit board on which the conversion element member is mounted.

14. The conversion element module according to claim 13, wherein
the circuit board has a transmission port allowing sound and/or gas to be transmitted to and from the opening of the conversion element, and
the conversion element member is fixed to the circuit board with the waterproof membrane inserted into the transmission port.

15. An electronic device comprising:
a housing provided with an external transmission port allowing sound and/or gas to pass therethrough; and
the conversion element member according to claim 1 placed in the housing, wherein
the conversion element member is placed in the housing such that entry of water from an outside of the housing into the opening through the external transmission port is prevented by the waterproof membrane.

16. The electronic device according to claim 15, further comprising
a sound conversion part configured to perform conversion between an electric signal and sound, wherein
the sound conversion part includes the conversion element member including an acoustic conversion element as the conversion element, and
the conversion element member is placed in the housing such that sound is allowed to be transmitted between the outside and the opening through the external transmission port.

17. The conversion element member according to claim 1, wherein
the spacing distance D1 between the waterproof membrane and the outer surface in the region is 0.01 mm or more and 2 mm or less.

18. The conversion element member according to claim 1, wherein
the spacing distance D1 between the waterproof membrane and the outer surface in the region is 0.01 mm or more and 1.71 mm or less.

19. The conversion element member according to claim 1, wherein
the spacing distance D1 between the waterproof membrane and the outer surface in the region is 0.01 mm or more and 0.40 mm or less.

* * * * *